US008644123B2

(12) United States Patent
Horimai

(10) Patent No.: US 8,644,123 B2
(45) Date of Patent: Feb. 4, 2014

(54) HOLOGRAM GENERATING DEVICE AND HOLOGRAM PRINTER

(75) Inventor: Hideyoshi Horimai, Yokohama (JP)

(73) Assignee: Optware Corporation, Kanagawa (JP)

( * ) Notice: Subject to any disclaimer, the term of this patent is extended or adjusted under 35 U.S.C. 154(b) by 231 days.

(21) Appl. No.: 12/996,398

(22) PCT Filed: Jun. 5, 2009

(86) PCT No.: PCT/JP2009/002561
§ 371 (c)(1),
(2), (4) Date: Feb. 22, 2011

(87) PCT Pub. No.: WO2009/147867
PCT Pub. Date: Dec. 10, 2009

(65) Prior Publication Data
US 2011/0134497 A1   Jun. 9, 2011

(30) Foreign Application Priority Data
Jun. 6, 2008  (JP) .................................. 2008-149821

(51) Int. Cl.
*G11B 7/00*     (2006.01)
*G03H 1/26*     (2006.01)
(52) U.S. Cl.
USPC ............................................ 369/103; 359/22
(58) Field of Classification Search
USPC .................... 359/22, 24, 25; 369/103
See application file for complete search history.

(56) References Cited

U.S. PATENT DOCUMENTS 6,366,368 B1 * 4/2002 Horimai ............................ 359/9
2008/0279061 A1 * 11/2008 Ogasawara et al. ......... 369/44.37
2008/0316555 A1 * 12/2008 Kaneko et al. .................... 359/3

FOREIGN PATENT DOCUMENTS

JP        11-249536       9/1999
JP         3324328        9/2002
WO   WO 2006098455 A1 *  9/2006
WO   WO 2006114835 A1 * 11/2006

OTHER PUBLICATIONS

Wikipedia, Holography: available at http://en.wikipedia.org/wiki/Holography.*
Wikipedia, Holography: available at http://en.wikipedia.org/wiki/Holography. Retrieved on Feb. 5, 2013. Publication date not known.*

* cited by examiner

*Primary Examiner* — Stephone B Allen
*Assistant Examiner* — KImberly N Kakalec
(74) *Attorney, Agent, or Firm* — William C. Schrot; AuerbachSchrot LLC

(57) ABSTRACT

The invention provides a hologram generating device and a hologram generating method that allows the generation of a hologram for reproducing an easily observable three-dimensional image without restrictions on object sizes. The hologram generating device includes an object light generation means, a reference light generation means, an irradiation means, a polarization light selecting reflection means, and a polarization conversion means, wherein the one of the object light and the reference light incident from the rear surface is made to interfere with the other of the object light and reference light incident from the front surface in the hologram recording layer to record a reflection type hologram on the hologram recording layer.

9 Claims, 13 Drawing Sheets

Prior Art

HOLOGRAM GENERATING DEVICE AND HOLOGRAM PRINTER

TECHNICAL FIELD

The present invention relates to a device for recording a hologram formed by interference between object light and reference light, and in particular, a hologram generating device and a hologram printer which are capable of generating a hologram for reproducing a three-dimensional image.

BACKGROUND ART

In recent years, with the developments in computer-related technology, three-dimensional image information has been easily handled. As a means for outputting three-dimensional image information handled by computers, it has been common to carry out pseudo three-dimensional display on a display. In the case of this pseudo three-dimensional display, freely moving an image displayed on a display allows the displayed image to be observed in a three-dimensional way. However, it is difficult to express three-dimensional image information sufficiently in the pseudo three-dimensional display, because no true three-dimensional image is displayed.

Therefore, devices have been researched for generating a hologram for reproducing a three-dimensional image. Patent Document 1 discloses a device for generating a transmission type hologram on a recording medium by radiating object light and reference light from the same side of the recording medium. FIG. 13 shows a section of an optical system in Patent Document 1. In Patent Document 1, light of S-polarized light emitted from a light source is converted by a spatial light modulator to predetermined light of S-polarized light or P-polarized light for each pixel, and the light is made incident to a beam splitter 37 of FIG. 13 from the side, and reflected by a semi-reflecting surface 37a. Then, light of P-polarized light of the light incident to a S-polarized light hologram 35 directly passes, as a parallel beam of light, through the S-polarized light hologram 35 to serve as reference light for recording, whereas light of S-polarized light of the light incident to a S-polarized light hologram 35 is made slightly convergent by the S-polarized light hologram 35 to serve as information light for recording. The reference light for recording and the information light for recording are made incident to a two-fraction optical rotation plate 34, and the reference light for recording, which has passed through the optical rotation plate 34L, is converted to B polarized light, whereas the reference light for recording, which has passed through the optical rotation plate 34R, is converted to A polarized light. Conversely, the information light for recording, which has passed through the optical rotation plate 34L, is converted to A polarized light, whereas the information light for recording, which has passed through the optical rotation plate 34R, is converted to B polarized light. After that, the reference light for recording is collected by an objective lens 32 to irradiate a recording medium 1, and converges to have the smallest diameter at the lower end of a guide section 5 on the rear side of the recording medium 1. In addition, the information light for recording is collected by the objective lens 32 to irradiate a recording medium 1, converges to have the smallest diameter once before the recording medium 1, and then passes through the recording medium 1 while diverging.

The reference light for recording, which has passed through the optical rotation plate 34R, and the information light for recording, which has passed through the optical rotation plate 34L are both A polarized light, and thus interfere with each other, and the interference pattern is recorded on the recording medium 1. In addition, the reference light for recording, which has passed through the optical rotation plate 34L, and the information light for recording, which has passed through the optical rotation plate 34R are both B polarized light, and thus interfere with each other, and the interference pattern is recorded on the recording medium 1. In this way, the partial hologram is formed on the recording medium 1. It is to be noted that the reference light for recording is modulated into return light by an emboss pit 5a provided at the lower end of the guide section 5, in such a way that the return light is made incident to the objective lens 32. This return light passes through the two-fraction optical rotation plate 34 and the S-polarized light hologram 35 to be made incident to the beam splitter 37, in which the amount of light partially transmits through the semi-reflecting surface 37a, and passes through a convex lens 38 and a cylindrical lens 39 to be made incident to a four-section photodetector 40. Then, this return light is used to carry out the reproduction of focus servo, tracking servo, and basic clock.

In addition, Patent Document 2 discloses a device for generating a reflection type hologram on a recording medium by placing a reflection type hologram, a concave mirror, etc. for reproducing a planar wave through the incidence of a spherical wave to the rear surface of the recording medium. In the device of Patent Document 2, spatially modulated object light is radiated as spherical waves from the surface of the recording medium, the object light composed of spherical waves transmitting through the recording medium is used to reproduce planar waves from the reflection type hologram, the concave mirror, etc., which are placed on the rear surface, and the reproduced planar waves are made incident as reference light to the recording medium from the rear surface thereof to form a reflection type hologram along with the object light radiated to the recording medium.

PRIOR ART DOCUMENTS

Patent Documents

Patent Document 1: Japanese Patent Application Laid-Open No. 11-249536
Patent Document 2: Japanese Patent No. 3324328

DISCLOSURE OF THE INVENTION

Problems to be Solved by the Invention

In the hologram generating device in Patent Document 1 described above, the operation of forming a portion of an interference pattern for generating reproduced light corresponding to a desired three-dimensional image when reference light for reproduction is radiated as object light and reference light for recording is carried out more than once while changing the recording position in the recording medium, thereby allowing one hologram to be generated as a whole, and allowing a desired three-dimensional image to be reproduced from the whole hologram. Thus, the hologram generating device allows a hologram for reproducing a three-dimensional image to be generated in a simple manner without restrictions on the size of the three-dimensional image reproduced, the size of the hologram, or the reference light for reproduction. Furthermore, the device can be reduced in size because the configuration is adopted in which object light and reference light are radiated in a coaxial manner from the same surface side of the recording medium.

However, the hologram formed in accordance with Patent Document 1 is a transmission type hologram, and in order to reproduce the spatial three-dimensional image, a light source is required which emits light from the rear surface of the recording medium (the opposite side of the recording medium from an observer). Thus, a device or an apparatus for observation is required, such as an OHP (overhead projector). Therefore, it has not been possible to enjoy three-dimensional images lightly. In addition, the transmission type hologram has the problems such as poor wavelength selectivity, a tendency to cause color deviation in the reproduced image in the case of carrying out the reproduction with the use of a white light source, and difficulty to obtain a distinct three-dimensional image.

The hologram generating device in Patent Document 2 described above generates reference light with the use of object light transmitting through the recording medium, and is thus unable to record and display a desired three-dimensional image with accuracy, because the light intensity of the generated reference light depends on the intensity of the object light radiated in that case. For example, if an image of object light is bright as a whole, but contains a bright section and a dark section, reference light with a relatively strong light intensity is reproduced because the whole object light is bright. When this reference light interferes with the bright section of the object light, an interference fringe is formed which has high diffraction efficiency. However, even when the reference light interferes with the dark section of the object light, the diffraction efficiency is not substantially low because the light intensity of the reference light is relatively strong, and the dark section of the object light is brightly reproduced unnaturally. In addition, in the case of object light of a dark image as a whole containing a bright section and a dark section, reference light with a relatively weak light intensity is generated, an interference fringe is thus formed which has a low diffraction efficiency even for the bright section of the object light, and the intrinsically bright section is displayed darkly. Furthermore, the lack of the light intensity of the reference light also causes problems such as failure to form the interference fringe itself and generation of a reproduced image with solarization (inversion), etc. As described above, the method in Patent Document 2 has the problem of deteriorated display quality of a three-dimensional image reproduced, because the light intensity of the reference light as the standard for the brightness differs for each partial hologram.

An object of the present invention is to provide a hologram generating device and a hologram generating method which allows the generation of a hologram for reproducing an easily observable three-dimensional image without restrictions on the size of the three-dimensional image reproduced or the size of the hologram.

Means for Solving the Problems

A hologram generating device according to the present invention includes a light source; object light generation means for generating object light in a first polarization direction with the use of a portion of light from the light source; a reference light generation means for generating reference light in a second polarization direction intersecting with the first polarization direction at right angle with the use of other portion of light from the light source; an irradiation means for irradiating a front surface side of a hologram recording layer of a recording medium with the object light and the reference light; a polarization light selecting reflection means placed on a rear surface side of the hologram recording layer for reflecting only either one of object light and reference light transmitting through the hologram recording layer; and a polarization conversion means placed between the hologram recording layer and the polarization light selecting reflection means for converting one of the object light and reference light reflected by the polarization light selecting reflection means to light in a polarization direction intersecting with that in the case of transmitting through the hologram recording layer at right angle, before reaching the hologram recording layer, in which a reflection type hologram is recorded on the hologram recording layer, the reflection type hologram formed by interference between one of the object light and reference light incident from the rear surface side of the hologram recording layer, having the polarization direction converted by the polarization conversion means, and the other of the object light and reference light incident from the front surface side of the hologram recording layer.

In the hologram generating device described above, the irradiation means preferably irradiates the recording medium with the reference light as substantially parallel light. Furthermore, more preferably, the reference light generation means generates multiple rays of reference light, and the multiple rays of reference light pass through the hologram recording layer as multiple rays of substantially parallel light in different travelling directions.

In addition, in the hologram generating device described above, a section of the reference light generation means may be placed on a rear surface side of the hologram recording layer, in such a way that multiple rays of reference light are generated in the section of the reference light generation means placed on the rear side. Alternatively, the reference light generation means may include a spatial light modulator which also function as at least a section of the object light generation means, in such a way that point light sources to serve as multiple rays of reference light are displayed outside a region of the spatial light modulator in which image information of object light is displayed.

In the hologram generating device described above, the irradiation means preferably includes an objective lens, and irradiates the recording medium with a Fourier transformed image of the object light. The polarization light selecting reflection means is preferably a wire grid polarizer or a cholesteric liquid crystal film.

In addition, a hologram printer according to the present invention is characterized in that the reflection type hologram recorded on the hologram recording layer is a portion of a hologram from which a three-dimensional image is reproduced through irradiation with reference light for reproduction, and the reflection type hologram is recorded repeatedly in a planar direction of the recording medium to record a hologram from which one three-dimensional image is reproduced as a whole.

Furthermore, in the hologram printer, the object light preferably carries image information calculated from a three-dimensional partial image calculated from a three-dimensional image to be reproduced.

Advantageous Effects of the Invention

The hologram generating device has the configuration described above. Thus, even when the hologram recording layer of the recording medium is irradiated with object light and reference light from the front surface side of the hologram recording layer of the recording medium, the first polarization direction intersects with the second polarization direction at right angle, there is thus no interference between the object light and the reference light during the irradiation, and no transmission type hologram is formed from the object light and the reference light. However, only either one of the object light and reference light transmitting through the hologram recording layer is reflected by the polarization light selecting reflection means toward the hologram recording layer, and converted by the polarization conversion means to light in a polarization direction intersecting with that of transmitting through the hologram recording layer at right angle, before reaching the hologram recording layer, to interfere with the other of the object light and reference light incident from the front surface side of the recording medium. Thus, a reflection type hologram can be recorded on the hologram recording layer. Details including other advantageous effects will be clarified in the description of embodiments described below.

BEST MODE FOR CARRYING OUT THE INVENTION

Figure 1:
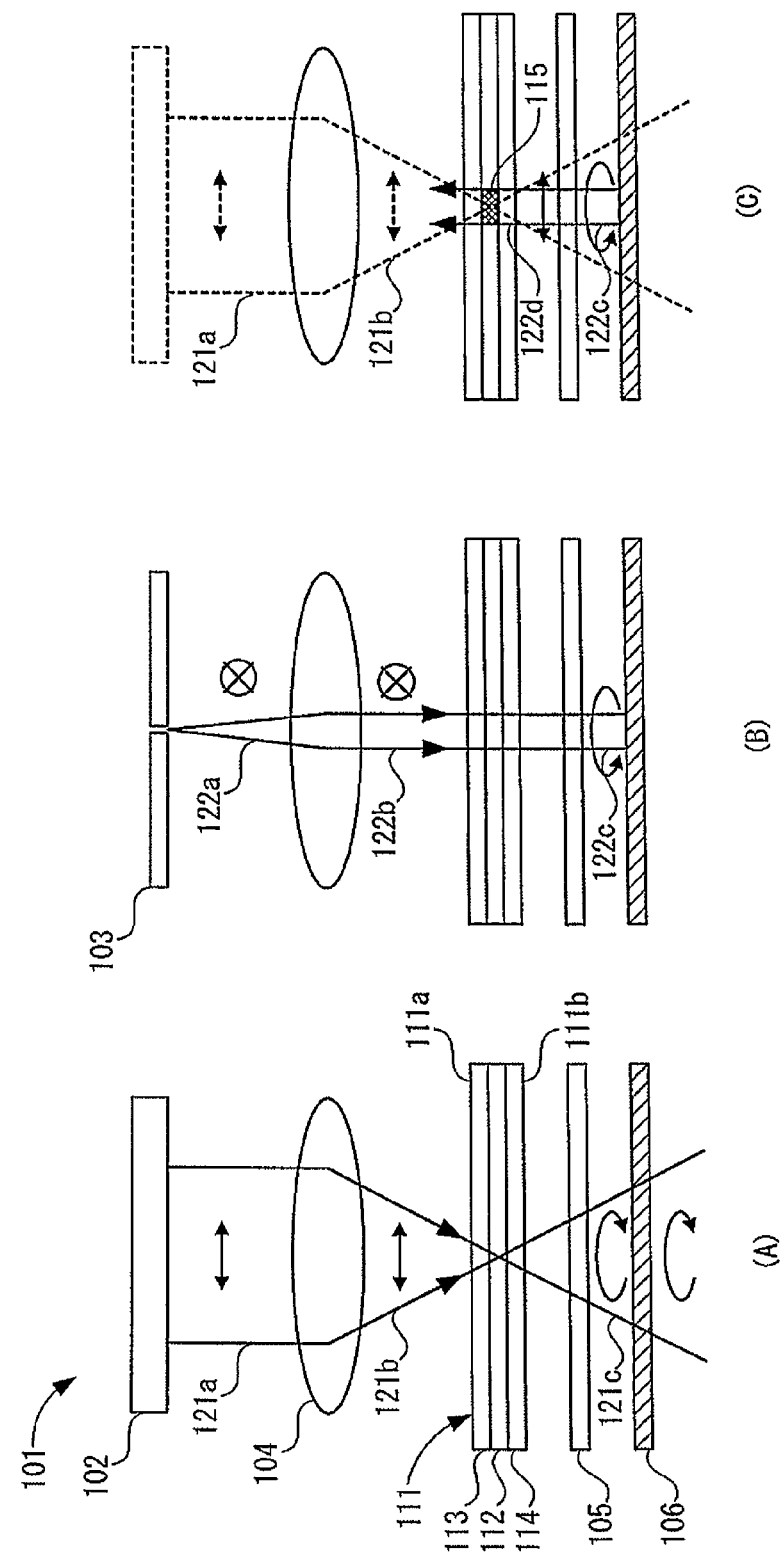
[FIG. 1] (A) a schematic diagram illustrating an optical path of object light; (B) a schematic diagram illustrating an optical path of reference light during irradiation; and (C) a schematic diagram for explaining an optical path of reflected reference light and interference between reference light and object light.

Embodiments of the present invention will be described below. FIG. 1 is a explanatory diagram illustrating the principle of an operation of recording a hologram in a hologram generating device according to the present invention, where FIG. 1(A) a schematic diagram illustrating an optical path of object light, FIG. 1(B) a schematic diagram illustrating an optical path of reference light during irradiation; and FIG. 1(C) a schematic diagram for explaining an optical path of reflected reference light and interference between reference light and object light.

A hologram generating device 101 according to the present invention includes a light source, not shown, an object light generation means 102, a reference light generation means 103, an irradiation means 104, a polarization conversion means 105, and a polarization light selecting reflection means 106, and forms a reflection type hologram by interference between object light 121 and reference light 122 in a recording medium 111. It is to be noted that in FIG. 1, for the polarization directions of the object light 121 and the reference light 122, P-polarized light vibrating parallel to the plane of paper is indicated by a horizontal double-headed arrow, S-polarized light (polarized light intersecting with the P-polarized light at right angle) vibrating perpendicular to the plane of paper is indicated by a circle with a symbol x therein, right circularly polarized light rotating in a clockwise fashion with propagation of light is indicated by a right-handed arrow, and left circularly polarized light (polarized light intersecting with the right circularly polarized light at right angle) rotating in an anticlockwise fashion with propagation of light is indicated by a left-handed arrow. In addition, in accordance with the polarization direction or the shape of the light, alphabets a, b . . . are assigned to the ends of the signs of "121" and "122".

First, the operation of the hologram generating device 101 according to the present invention will be described briefly, and the respective configurations will be then described in detail. The object light generation means 102 uses a portion of light from the light source, not shown, to generate object light 121a in a direction of vibration or in a direction of rotation of a first polarization direction (P-polarized light in FIG. 1), and the reference light generation means 103 uses other portion of the light from the light source, not shown, to generate reference light 122a in a direction of vibration or in a direction of rotation of a second polarization direction intersecting with the first polarization direction of the object light (S-polarized light in FIG. 1) at right angle. Then, the irradiation means 103 including an objective lens irradiates a hologram recording layer 112 with object light 121b and reference light 122b from a front surface 111a side of the recording medium 111. However, since the polarization direction of the object light 121b intersects with the polarization direction of the reference light 122b at right angle, there is no interference between the object light 121b and the reference light 122b during the irradiation, and no hologram is thus formed by the object light 121b and the reference light 122b. Either one of object light 121c and reference light 122c transmitting through the hologram recording layer 112 and further through the polarization conversion means 105 (the reference light 122c in FIG. 1) is reflected toward the hologram recording layer 112 by the polarization light selecting reflection means 106 placed on a rear surface 111b side of the recording medium 111 more than the hologram recording layer 112. Then, either one of the object light 121c and reference light 122c reflected by the polarization light selecting reflection means 106 (the reference light 122c in FIG. 1) is converted by the polarization conversion means 105 to light in a polarization direct intersecting with the polarization direction of transmitting through the hologram recording layer 112 at right angle (P-polarized light in FIG. 1). Either one of object light and reference light with its polarization direction converted (reference light 122d in FIG. 1) corresponds in polarization direction (P-polarized light in FIG. 1) with the other of the object light 121b and reference light 122b incident from the front surface 111a of the recording medium 111 (the object light 121b indicated by a dotted line in FIG. 1(C)) in the hologram recording layer 112 of the recording medium 111, thereby forming a reflection type hologram 115 therebetween, and the reflection type hologram 115 is recorded on the hologram recording layer 112.

The recording medium 111 is a transmission type medium for transmitting at least a portion of the object light 121 and of the reference light 122, and includes the hologram recording layer 112 containing a photosensitive material which is sensitive to the wavelengths of the object light 121 and reference light 122. As the material of the hologram recording layer 112, for example, photopolymers, etc. are used. In addition, in the case of the recording medium 111, the incidence plane 111a for both of the object light 121 and the reference light 122 is referred to as a surface (an upper surface in FIG. 1), whereas the other surface 111b is referred to as a rear surface. In FIG. 1, the hologram recording layer 112 is sandwiched by a pair of transparent substrates 113, 114. Furthermore, the surface and rear surface of the recording medium 111 may be provided with an antireflection coat or an antireflection film. The recording medium 111 preferably has the shape of a sheet or a thin plate, and the transparent substrate may be not only a glass substrate and a plastic substrate in the form of plates, but also base films and coating layers such as polymer materials in the form of thin films, etc. It is to be noted that the surface 111a side and rear surface 111b side of the hologram recording layer 112 means directions with respect to the hologram recording layer 112, which include not only outside the recording medium 111, but also inside the recording medium 111. For example, the polarization conversion means 105, or the polarization conversion means 105 and polarization light selecting reflection means 106 may be stacked in the recording medium 111 integrally.

The recording medium 111 is preferably able to be moved by a recording medium moving means, not shown, with respect to the positions irradiated with the object light 121 and the reference light 122. With respect to directions parallel to the surface of the recording medium 111, the recording medium 111 is able to be moved at least in a uniaxial direction, preferably in biaxial directions intersecting with each other at right angle.

The light source, not shown, is intended to generate a coherent beam of light, for which a Q-switch laser and a semiconductor laser can be used, for example. The Q-switch laser allows recording in a short period of time because of its high output, but has a short coherent length of several mm, and thus requires precise control of the optical path lengths of the object light and reference light. For this reason, in the case of using a laser with a short coherent length, such as a Q-switch laser, as the light source, an optical path length changing means as will be described later is preferably provided in the optical path of the object light or reference light. The semiconductor laser is a CW laser, which has a long coherent length of several m and is highly coherent, but takes a long irradiation time to record a hologram because of its low output, and thus requires the prevention of vibrations, etc. during the irradiation. For this reason, in the case of using a semiconductor laser as the light source, a vibration eliminating pedestal or the like is preferably provided.

In addition, in order to record and reproduce a color three-dimensional image, it is preferable to provide three types of light sources of red (R), green (G), and blue (B) as the light source. In this case, for the recording medium 111, three types of hologram recording layers are stacked which correspond to three types of light of red (R), green (G), and blue (B), or a hologram recording layer is provided containing three types of photosensitive materials which are sensitive respectively to the three types of light.

The object light generated by the object light generation means 102 is either linearly polarized light, right circularly polarized light, or left circularly polarized light for irradiation of the recording medium 111, and the object light has a first polarization direction as the direction of vibration of linearly polarized light or the direction of rotation of circularly polarized light. The object light carries image information for spatially modulating the light to be recorded in the hologram. As the object light generation means 102, a transmission-type or reflection-type spatial light modulator can be used which has a plurality of pixels arranged in a matrix and can modulate the phase or/and intensity of light emitted for each pixel. As the spatial light modulator, a DMD (Digital Micromirror Device) and a matrix-type liquid crystal element can be used. The plurality of pixels of the spatial light modulator displays the carried image information, and each pixel modulates a portion of light from the light source, thereby allowing the object light to be generated. The display surface of the spatial light modulator is placed in the incident pupil plane of the objective lens of the irradiation means 104 or in a position conjugate to the incident pupil plane. Further, when the light from the light source is linearly polarized light or circularly polarized light, the object light can be generated directly by the spatial light modulator. If this is not the case, the light from the light source may be changed by a polarization plate or the like into linearly polarized light. In addition, in order to form circularly polarized light, the linearly polarized light may be further passed through a quarter wavelength plate.

The reference light generated by the reference light generation means 103 is, for irradiation of the recording medium 111, linearly polarized light in a direction of vibration intersecting with the direction of vibration of the object light at right angle when the object light is linearly polarized light, or circularly polarized light in a direction of rotation opposite to the direction of rotation of the object light when the object light is right circularly polarized light or the left circularly polarized light. As the reference light generation means 103, a concave mirror, a convex mirror, a concave lens, a convex lens, a mask with an opening in a predetermined shape, a transmission-type or reflection-type spatial light modulator, a hologram diffraction element, etc. can be used by themselves or in combination, and furthermore, in order to intersect the polarization direction with the object light at right angle, a half wavelength plate or a quarter wavelength plate may be appropriately combined. In the case of using a spatial light modulator as the reference light generation means 103, a section of the spatial light modulator used as the object light generation means 102 in which any image of the object light is not displayed may be used as the reference light generation means 103, or a different spatial light modulator may be provided. The reference light 122 may be located in a position superimposed with the object light 121 in the incident pupil plane of the objective lens, or may be located in a non-superimposed position in the incident pupil diameter of the objective lens. When the object light is superimposed with the reference light, it is necessary to provide the object light generation means 102 and the reference light generation means 103 separately. When the object light is not superimposed with the reference light, the object light generation means 102 can be shared with the reference light generation means 103.

The reference light 112 determines the condition of reference light for reproduction for reproducing a recorded hologram. More specifically, since the hologram is reproduced by the same wavefront as the wavefront of the reference light 122 in the case of interference with the object light 121, light with the same wavefront as the wavefront of the reference light 122 will be used as the reference light for reproduction.

In addition, the irradiation means preferably irradiates the recording medium 111 with the reference light as substantially parallel light. When the reference light of substantially parallel light is used to form a hologram, a three-dimensional image can be reproduced by irradiating the hologram with the substantially parallel light for reproduction. The reflection type hologram (also referred to as a Lippmann type hologram) recorded by the object light and the reference light in the present invention has high angle selectivity. Thus, even when slightly diffusing light or converging light is radiated, rather than parallel light, for irradiation in reproduction as the reference light for reproduction, the formation of the reflection type hologram with the use of the reference light of substantially parallel light allows a three-dimensional image to be reproduced by the same parallel light component of the reference light for reproduction as that for recording, and makes it less likely to cause strain in a reproduced image.

In order to irradiate the recording medium 111 with the reference light of substantially parallel light, reference light may be shaped such that a point light source is placed in the incident pupil plane of the objective lens of the irradiation means 104 or in a position conjugate to the incident pupil plane. For example, diffusing light may be generated by a concave mirror, a convex mirror, a lens, or a mask with an opening in a predetermined shape such that the focal point is located in the incident pupil plane, or reference light may be generated only from a microscopic region (one pixel or several pixels) of the spatial optical modulator. In the case of irradiation with substantially parallel light as the reference light, the diameter of the substantially parallel light is made equal to or greater than the spot diameter (in the position for the smallest diameter) of the object light. When the diameter of the substantially parallel light is made equal to the spot diameter of the object light, a hologram can be efficiently formed in a planar direction.

While the reference light of the substantially parallel light may be made incident perpendicular to the recording medium, the reference light may have a predetermined incidence angle in consideration of the condition for observing the recorded hologram. For example, since the recording medium is often illuminated from above in general environments, an oblique angle provided above the hologram facilitates observations in general environments. In order for the substantially parallel light to have a predetermined incidence angle, the position of the point light source may be moved parallel from the optical axis in the incident pupil plane of the objective lens. It is to be noted that the recording medium may be irradiated with the reference light allowed to converge by the irradiation means in the same way as with the object light. In this case, the reproduction is carried out with the use of reference light of a spherical wave for reproduction.

Furthermore, as the reference light, multiple rays of substantially parallel light in different travelling directions are preferably passed through in the hologram recording layer 112. As these multiple rays of reference light, the recording medium 111 may be irradiated with multiple rays of substantially parallel light which differ in incidence angle. When a hologram is recorded with the use of the multiple rays of reference light, the multiple rays of reference light form a reflection type hologram along with the object light. However, due to the interference between the rays of reference light, the rays of reference light form a transmission type hologram during irradiation, or during both irradiation and reflection. When this transmission type hologram is irradiated with a ray of parallel light from a certain direction, the hologram reproduces the other reference light. For this reason, when the reflection type hologram is irradiated with a ray of parallel light from a certain direction, the reproduction is carried out with the use of the parallel light and the other reference light reproduced by the parallel light from the transmission type hologram. Thus, blurring or strain is less likely to be caused in the reproduced image, and a reproduced image with a high degree of visibility is also obtained in the case of diffusing illumination light.

When the reflection type hologram is irradiated with parallel light as the reference light for reproduction, blurring or strain is less likely to be caused in the reproduced image. However, depending on the incidence angle of the reference light for reproduction, the reproduced image which is reproduced by reflection will be changed in direction of objection. For example, when the hologram is irradiated with parallel light emitted from close 2 points, two reproduced images corresponding to each parallel light will be reproduced to reproduce a doubly blurred reproduced image. However, in the case of forming object light and a reflection type hologram while using multiple rays of reference light which are substantially point-symmetric with respect to the center of the optical axis to form a transmission type hologram through interaction between the rays of reference light, the transmission type hologram irradiated with reference light for reproduction as any one of the rays of reference light reproduces all of the rays of reference light from the transmission type hologram. Thus, reproduced images can be obtained with the use of all of the rays of reference light from the reflection type hologram, and the reproduced images in different directions cancel out their phases from each other to keep from being reproduced, prevent doubly blurred reproduced images from being reproduced, and allow a distinct three-dimensional image to be reproduced with blurring and strain, and further generation of multiply-layered images suppressed.

The multiple rays of reference light may be obtained by arranging multiple point light sources in the incident pupil plane of the objective lens, and it is preferable as the arrangement to arrange the point light sources so that a ray of reference light is not located in a point-symmetric position with respect to the other ray of reference light with the optical axis of the objective lens as a center, because rays of reference light from various directions can be generated. The multiple rays of reference light can be generated with the use of a lens array, a concave mirror array, a HOE (holographic optical element), a mask with multiple openings, a spatial optical modulator, etc. If a diffraction grating is placed on the rear surface side of the hologram recording layer 112 to irradiate the recording medium 111 with one or a few rays of reference light, the one or a few rays of reference light transmitting through the recording medium 111 are diffracted by the diffraction grating, and the reference light is reflected by the polarization light selecting reflection means 106, thereby allowing the hologram recording layer to be irradiated with multiple or a large number of rays of reference light from the rear surface side of the hologram recording layer 112.

In FIGS. 1(A) and 1(B), the object light 121a generated by the object light generation means 102 is linearly polarized light (P-polarized light) with a polarization direction parallel to the plane of paper, and the reference light 122b generated by the reference light generation means 103 is S-polarized light in a direction of vibration intersecting with the P-polarized light at right angle. Furthermore, the reference light generation means 103 is a mask with a minute opening, which is placed in the incident pupil plane of the objective lens, and the irradiation means 104 irradiates the recording medium 111 with, as substantially parallel light, the reference light 122a generated as light emitted from the point light source.

The irradiation means 104 includes the objective lens, and has an optical system which applies Fourier transformation to the object light 121a formed as an image on the incident pupil plane to radiate the object light from the surface 111a side of the recording medium 111, and also radiates the reference light from the surface 111a side of the recording medium 111. While the specific structure of the optical system can be designed variously, the optical system is placed so that the object light 121 is formed as an image on the incident pupil plane of the objective lens.

The polarization conversion means 105 is placed between the hologram recording layer 112 of the recording medium 111 and the polarization light selecting reflection means 106, which converts at least the polarization direction of light reflected by the polarization light selecting reflection means 106 to a polarization direction intersecting with the polarization direction of transmitting through the hologram recording layer 112 at right angle. As the polarization conversion means 105, a quarter wavelength plate can be used. In addition, as other polarization conversion means, a Faraday element, a Kerr rotation element, and the like may be used which rotate a polarization plane by magneto-optical effect, or the rotation of a polarization plane through a liquid crystal element may be utilized. The quarter wavelength plate can cause, with respect to incident light, a phase difference for a quarter wavelength between an ordinary ray component and an extraordinary ray component, and change circularly polarized light to linear polarized light and linear polarized light to circularly polarized light. Therefore, the light to be reflected by the polarization light selecting reflection means 106 passes through the quarter wavelength plate on its way to the polarization light selecting reflection means 106, the light reflected from the polarization light selecting reflection means 106 also passes through the quarter wavelength plate again, and the light is thus converted to a polarization direction intersecting with the polarization direction of transmitting through the recording medium at right angle. It is to be noted that the polarization conversion means 105 may change the polarization direction of light which is not reflected by the polarization light selecting reflection means 106.

In FIG. 1(B), the reference light 122b of the S-polarized light transmitting through the recording medium 111 passes through the polarization conversion means 105 on its way to the polarization light selecting reflection means 106 to result in the reference light 122c of left circularly polarized light. Then, as shown in FIG. 1(C), the reference light 122c is reflected by the polarization light selecting reflection means 106, and passes through the polarization conversion means 105 to result in the reference light 122d of P-polarized light. It is to be noted that the quarter wavelength plate can convert linearly polarized light to both right circularly polarized light and left circularly polarized light by changing the orientation of the slow axis with respect to the direction of vibration of the linearly polarized light, and likewise, can convert circularly polarized light to both S-polarized light and P-polarized light.

The polarization light selecting reflection means 106 is placed on the rear surface 111b side of the hologram recording layer 112, which reflects, toward the hologram recording layer 112, only either one of object light and reference light transmitting through the hologram recording layer 112. Since the object light carries information on a three-dimensional image, the reflected light is preferably the reference light. As the polarization light selecting reflection means 106, a cholesteric liquid crystal film, a wire grid polarizer, a combination of a PBS (polarizing beam splitter) and a reflecting mirror, etc. can be used. The cholesteric liquid crystal film is provided with a cholesteric liquid crystal layer with a Grandjean orientation forming a helical structure in the thickness direction, which reflects one of right circularly polarized light and left circularly polarized light and transmits the other. In the case of the cholesteric liquid crystal film, the control of the helical pitch allows for the design of the wavelength of reflected light. The wire grid polarizer refers to thin metallic lines (wires) arranged in a regular manner, which reflects linearly polarized light in a direction of vibration parallel to the wires, and transmits linearly polarized light intersecting with the wires at right angle. The combination of the PBS and the reflecting mirror is configured in such a way that the PBS reflects only linearly polarized light in a predetermined direction of vibration for separation, whereas the reflecting mirror placed outside the region irradiated with object light further reflects the reflected linearly polarized light toward the recording medium 111 or the PBS. The use of the cholesteric liquid crystal film and the wire grid polarizer can invert reference light directly to lead to interference with object light at a relative angle of 180°, and can also reflect rays of reference light in multiple travelling directions at the same time. In the case of the combination of the PBS and the reflecting mirror, when the reflecting mirror reflects reference light toward the recording medium, the reflected reference light can be intersected with object light at a given angle, depending on the angle of the reflecting mirror. Alternatively, when the reflecting mirror reflects reference light toward the PBS, the reference light is allowed to interfere with object light at a relative angle of 180°, or one or more rays of reference light can be reflected at a predetermined relative angle.

In FIG. 1, a cholesteric liquid crystal film which reflects left circularly polarized light and transmits right circularly polarized light is placed as the polarization light selecting reflection means 106, for reflecting the reference light 122c of left circularly polarized light passing through the polarization conversion means 105 and transmitting the object light 121c of right circularly polarized light passing through the polarization conversion means 105. It is to be noted that the appropriate selection of a cholesteric liquid crystal film allows for a configuration which reflects right circularly polarized light and transmits left circularly polarized light, and the polarization directions of object light and reference light may be designed accordingly.

It is to be noted that while the recording medium 111, the polarization conversion means 105, and the polarization light selecting reflection means 106 are placed spaced apart from each other in FIG. 1 for the purpose of clearly explaining the polarization direction of light, etc., a configuration is preferably adopted in which the recording medium 111, the polarization conversion means 105, and the polarization light selecting reflection means 106 are arranged in contact with each other. In particular, it is preferable to provide the polarization conversion means 105 and the polarization light selecting reflection means 106 integrally and make the rear surface 111b side of the recording medium 111 serve as a guide member for holding the recording medium. Alternatively, the polarization conversion means 105, or the polarization conversion means 105 and the polarization light selecting reflection means 106 may be provided on the rear surface side of the hologram recording layer 112, for example, between the hologram recording layer 112 and the substrate 114, in the recording medium 111 to provide a configuration integrated with the recording medium 111. In this case, a section of the recording medium 111 serves as a section of the hologram generating device.

Figure 2:
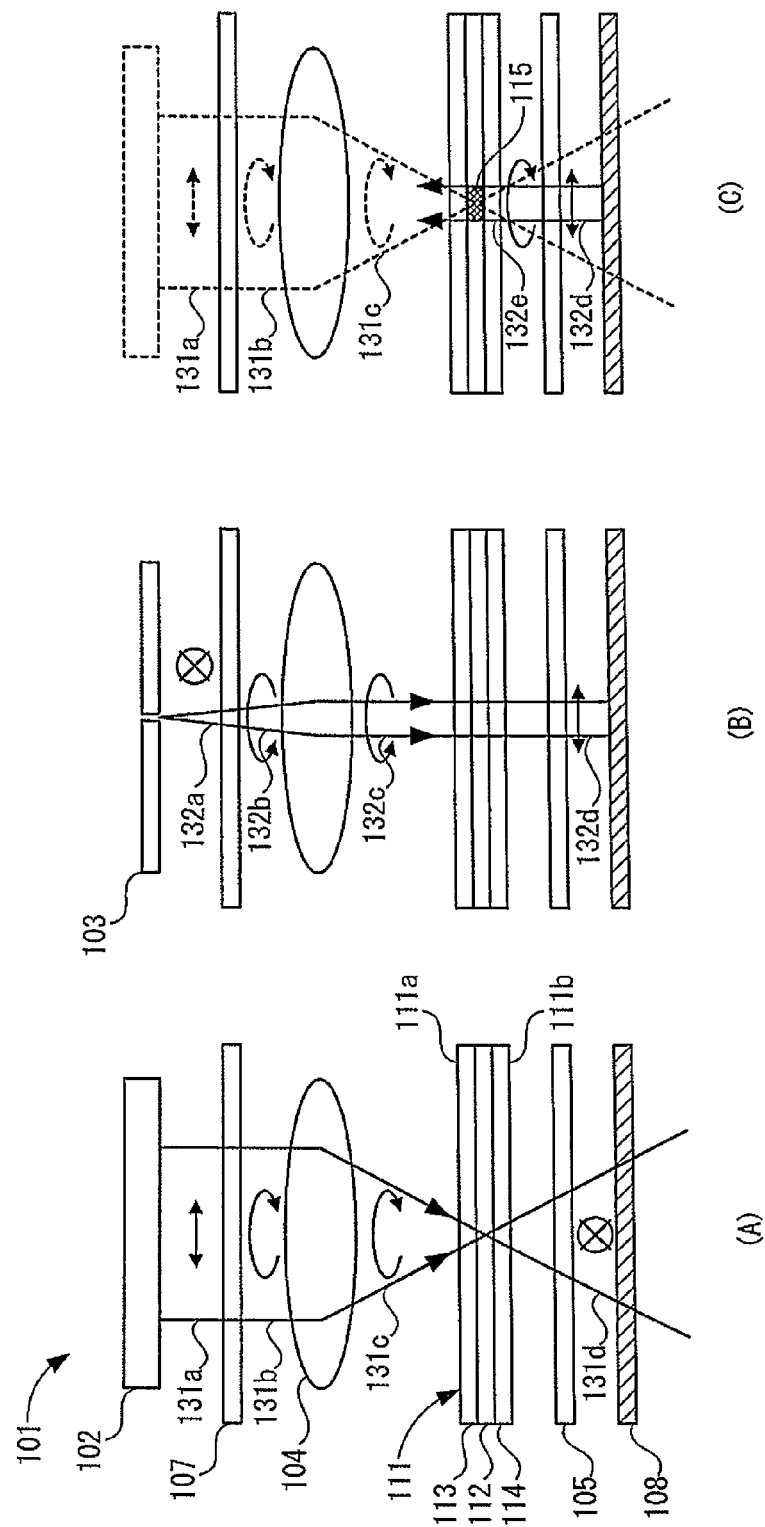
[FIG. 2] an explanatory diagram illustrating the principle of an embodiment using a wire grid polarizer as a polarization light selecting reflection means.

FIG. 2 is an explanatory diagram illustrating the principle of an embodiment using, as a polarization light selecting reflection means 108, a wire grid polarizer which transmits S-polarized light and reflects P-polarized light. FIG. 2(A) is a schematic diagram illustrating an optical path of object light, FIG. 2(B) is a schematic diagram illustrating an optical path of reference light during irradiation, and FIG. 2(C) is a schematic diagram for explaining an optical path of reflected reference light and interference between reference light and object light. The same reference numerals are assigned to the same configuration as that of FIG. 1, and the description of the configuration will be omitted.

As shown in FIG. 2(A), object light 131a of P-polarized light formed by an object light generation means 102 is converted by a first quarter wavelength plate 107 to object light 131b of right circularly polarized light, and an irradiation means 104 irradiates the recording medium 111 with the object light 131b as converging object light 131c. The object light 131c transmitting through the recording medium 111 is converted by a second quarter wavelength plate as a polarization conversion means 105 to object light 131d of S-polarized light, and the object light 131d transmits through the wire grid polarizer as the polarization light selecting reflection means 108.

As shown in FIG. 2(B), reference light 132a of S-polarized light formed by a reference light generation means 103 is converted by the first quarter wavelength plate 107 to reference light 132b of left circularly polarized light, and the irradiation means 104 irradiates the recording medium 111 with the reference light 132b as reference light 132c of parallel light. The reference light 132c transmitting through the recording medium 111 is converted by the second quarter wavelength plate as the polarization conversion means 105 to reference light 132d of P-polarized light, and the reference light 132d is reflected by the wire grid polarizer as the polarization light selecting reflection means 108. After that, as shown in FIG. 2(C), the reference light 132d of P-polarized light again passes through the second quarter wavelength plate as the polarization conversion means 105 to result in reference light 132e of right circularly polarized light, and the reference light 132e incident from the rear surface 111b side of the recording medium 111 interferes with the object light 131c of right circularly polarized light (indicated by a dotted line in FIG. 2(C)) from the surface 111a side of the recording medium 111 irradiated by the irradiation means 104 to form a reflection type hologram 115. It is to be noted that a configuration can be adopted in which the orientation of the wire grid polarizer is changed to reflect the S-polarized light and transmits P-polarized light, and the polarization directions of object light and reference light may be designed accordingly.

Figure 3:
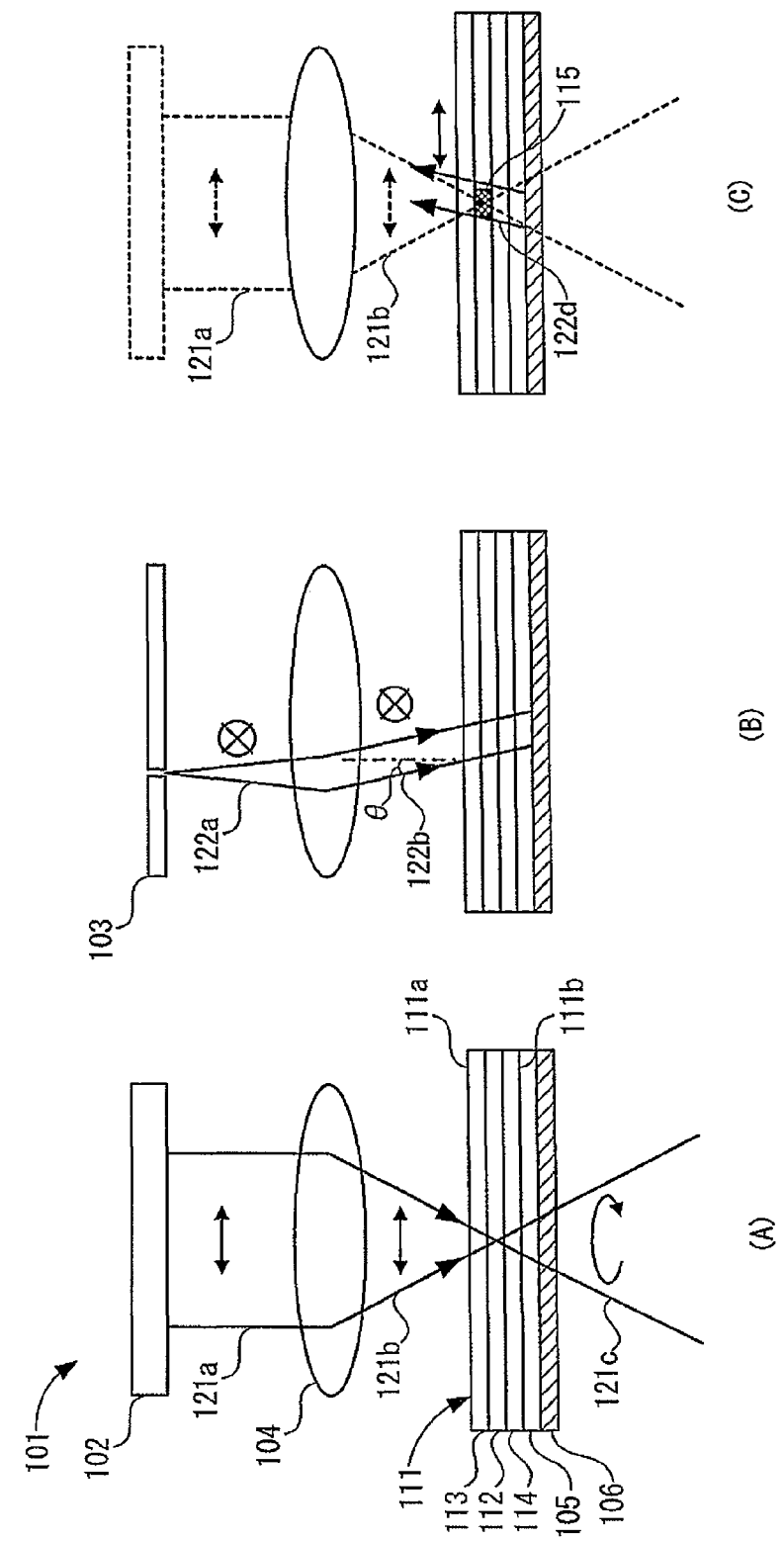
[FIG. 3] an explanatory diagram for an embodiment of irradiation with reference light at a predetermined incidence angle to a recording medium.

FIG. 3 is an explanatory diagram for an embodiment of irradiation with reference light at a predetermined incidence angle to a recording medium 111, rather than at an incidence angle of right angle. FIG. 3(A) is a schematic diagram illustrating an optical path of object light, FIG. 3(B) is a schematic diagram illustrating an optical path of reference light during irradiation, and FIG. 3(C) is a schematic diagram for explaining an optical path of reflected reference light and interference between reference light and object light. The same reference numerals are assigned to the same configuration as that of FIG. 1, and the description of the configuration will be omitted. It is to be noted that while the same optical components as those in FIG. 1 are basically used in FIG. 3, the recording medium 111, the polarization conversion means 105, and the polarization light selecting reflection means 106 are not spaced apart from each other, and arranged in contact with each other. Therefore, the reference light 122c generated only between the polarization conversion means 105 and the polarization light selecting reflection means 106 is not shown.

As shown in FIG. 3(B), the reference light generation means 103 has a minute opening in a position deviated from the center of the incident pupil plane (the optical axis of the objective lens) in the incident pupil plane of the objective lens of the irradiation means 104, and reference light 122a of S-polarized light generated by the reference light generation means 103 is made incident to a position deviated from the optical axis of the objective lens. Therefore, the reference light 122a is converted by the irradiation means 104 to oblique parallel light 122b toward the focal point of the object lens, and the light 122b is made incident to the recording medium 111 at a predetermined incidence angle θ. After that, the reference light 122b transmitting through the recording medium 111 passes through the polarization conversion means 105, and is reflected by the polarization light selecting reflection means 106. However, in this case, the reference light is made incident obliquely to the polarization light selecting reflection means 106, and thus reflected obliquely. After that, as shown in FIG. 3(C), reference light 122d of P-polarized light after passing through the polarization conversion means 105 is made incident from the rear surface 111b side of the recording medium 111, and interferes with object light 121b of P-polarized light (indicated by a dotted line in FIG. 3(C)) from the surface 111a side of the recording medium 111 irradiated by the irradiation means 104 to form a reflection type hologram 115. It is to be noted that a configuration is adopted in which a cholesteric liquid crystal film is used so as to reflect one of right circularly polarized light and left circularly polarized light and transmits the other in FIG. 3, in the same way as in FIG. 1.

As shown in FIG. 3, in the case of irradiation at a predetermined incidence angle, in order to expand the region in which the object light and the reflected light are overlapped with each other, it is preferable that the reference light incident to the objective lens be inclined at an angle to provide a so-called finite optical arrangement in such a way that the reference light is reflected by the polarization light selecting reflection means 106 and then provides a focal position in the hologram recording layer 112. The reference light is made incident to diffuse with respect to the optical axis of the objective lens.

Figure 4:
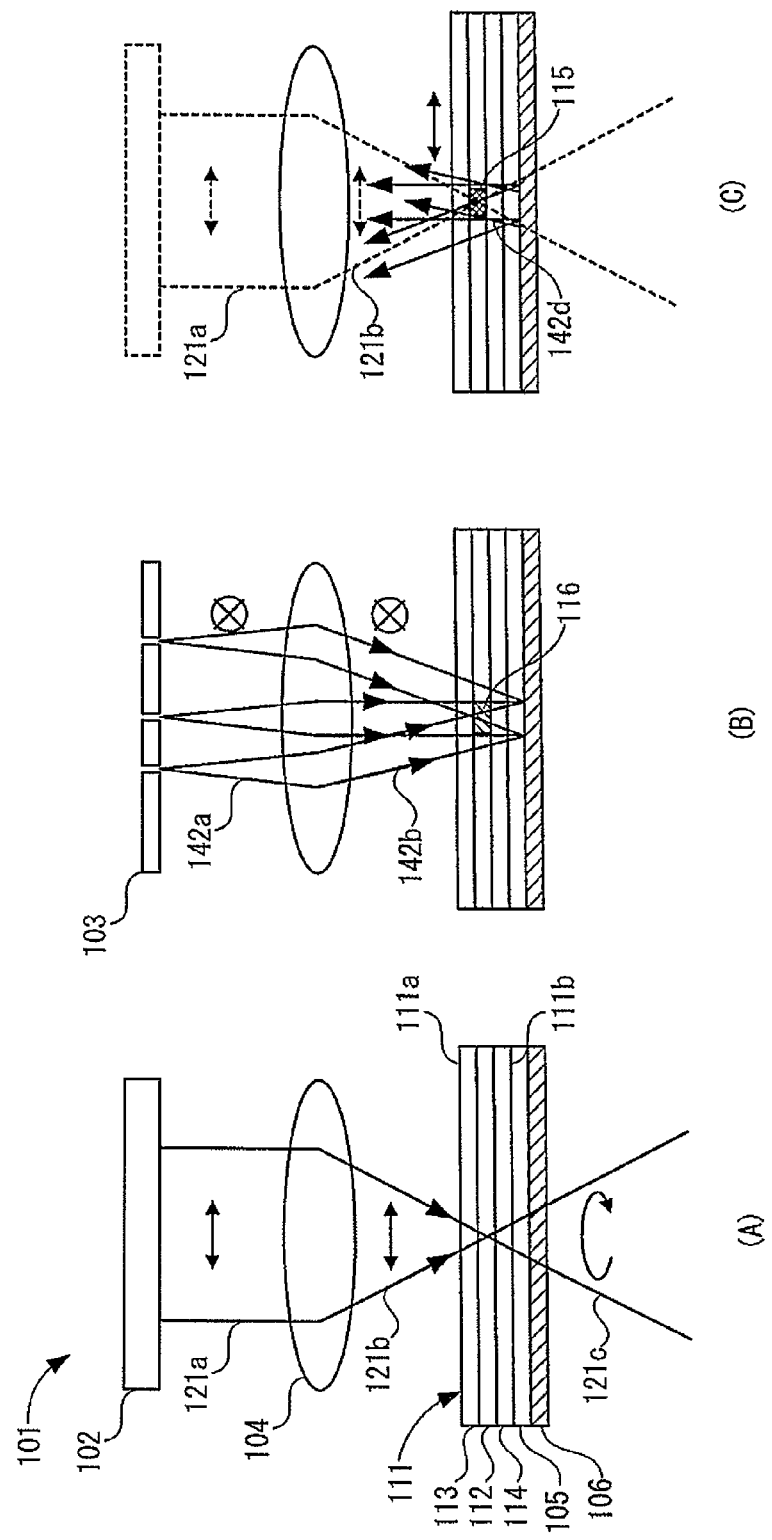
[FIG. 4] an explanatory diagram for an embodiment in which multiple rays of substantially parallel light in different travelling directions are transmitted as reference light.

FIG. 4 is an explanatory diagram for an embodiment in which multiple rays of substantially parallel light in different travelling directions are transmitted as reference light in a hologram recording layer 112. FIG. 4(A) is a schematic diagram illustrating an optical path of object light, FIG. 4(B) is a schematic diagram illustrating an optical path of reference light during irradiation, and FIG. 4(C) is a schematic diagram for explaining an optical path of reflected reference light and interference between reference light and object light. The same reference numerals are assigned to the same configuration as that of FIG. 1, and the description of the configuration will be omitted.

As shown in FIG. 4(B), the reference light generation means 103 has multiple minute openings in the incident pupil plane of the objective lens of the irradiation means 104, and multiple rays of reference light 142a of S-polarized light are generated by the reference light generation means 103. The multiple rays of reference light 142a of S-polarized light are each converted by the irradiation means 104 to parallel light 142b toward the focal point of the objective lens, and the recording medium 111 is irradiated with the multiple rays of reference light 142b which differ in incidence angle. Then, the multiple rays of reference light 142b interfere with each other in the hologram recording layer 112 of the recording medium 111 to form a first transmission type hologram 116, and the first transmission type hologram 116 is recorded. After that, the multiple rays of reference light 142b transmitting through the recording medium 111 each pass through the polarization conversion means 105, and are reflected by the polarization light selecting reflection means 106. After that, as shown in FIG. 4(C), multiple rays of reference light 142d of P-polarized light each transmitting through the polarization conversion means 105 are made incident from the rear surface 111b side of the recording medium 111, and interferes with object light 121b of P-polarized light (indicated by a dotted line in FIG. 4(C)) from the surface 111a side of the recording medium 111 irradiated by the irradiation means 104 to form a reflection type hologram 115, and the reflection type hologram 115 is recorded. Furthermore, when the reflected multiple rays of reference light 142d of P-polarized light are overlapped with each other in the hologram recording layer, a second transmission type hologram (not shown) is formed and recorded in the overlapped regions.

Figure 5:
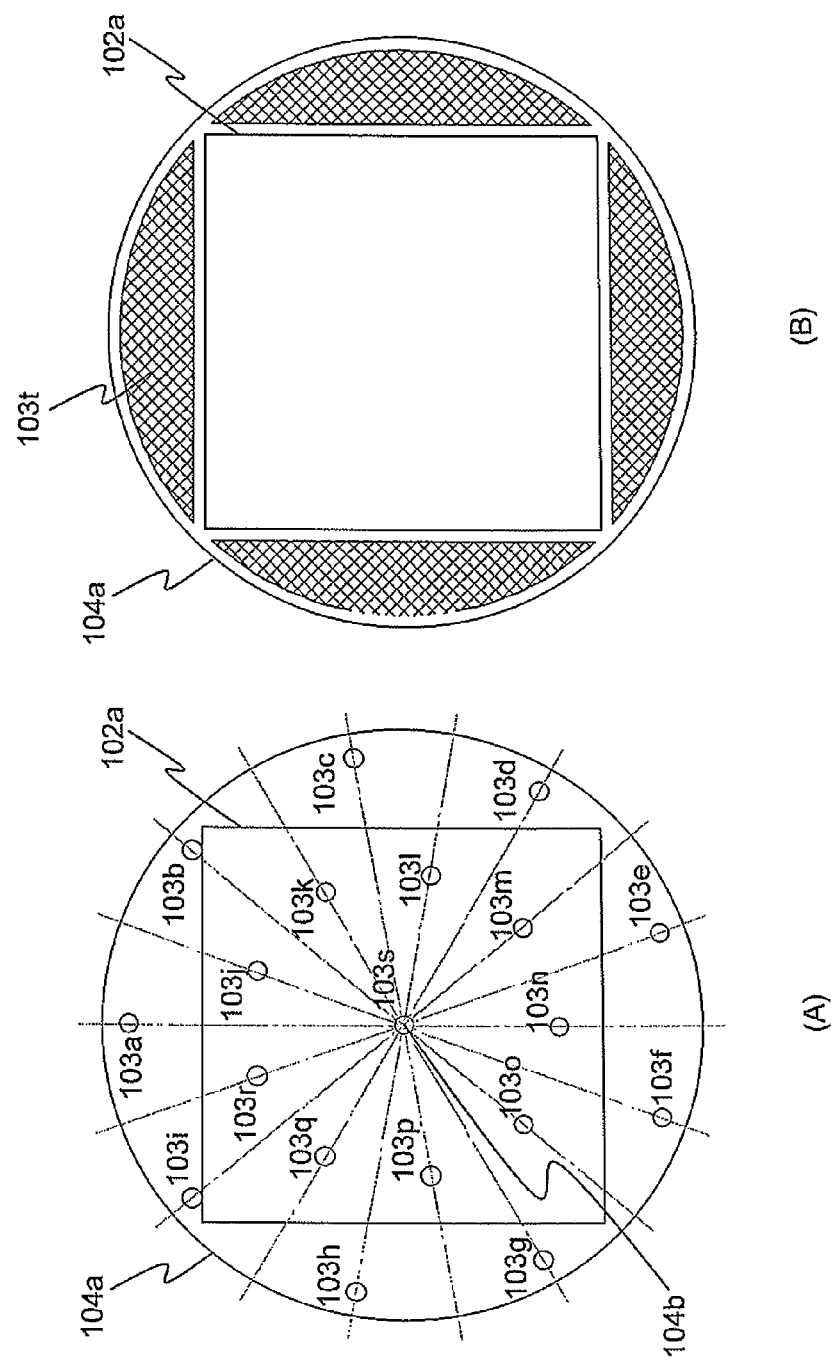
[FIG. 5] a diagram illustrating an arrangement of point light sources for multiple rays of reference light in the incident pupil plane of an objective lens.

FIGS. 5(A) and 5(B) show a diagram illustrating an arrangement of point light sources for multiple rays of reference light in the incident pupil plane of an objective lens. In FIG. 5(A), 19 point light sources 103a to 103s for reference light are scattered about in an incident pupil diameter 104a of an objective lens, including a region 102a of object light. In FIG. 5(A), the point light sources 103a to 103r are arranged so that reference light is not located in a point-symmetric position with respect to the other reference light with an optical axis 104b of the objective lens as a center. More specifically, the point light sources 103a to 103r are arranged respectively on 18 lines in a radial fashion with the optical axis 104b of the incident pupil diameter 104a as a center, and the point light sources 103a to 103i are arranged every other line near the circumference of the incident pupil diameter 104a on the radial lines, whereas the point light sources 103j to 103r are arranged likewise every other line at the midpoints on the radial lines. Therefore, while the radial line for the point light source 103a and the radial line for the point light source n are point-symmetric with the optical axis 104b as a center, the point light sources are positioned respectively near the circumference and at the midpoints, which are not overlapped with each other. It is to be noted that the point light source 103s is located on the optical axis 104b. This arrangement allows an interference fringe to be effectively formed, because of fewer components of reference light opposed to each other when the reference light is reflected to be returned. In the case of the arrangement of FIG. 5(A), since the region 102a of object light is overlapped with the point light sources 103i to 103s for reference light, it is necessary to separate light from the light sources into two light paths and generate object light and reference light in each light path.

FIG. 5(B) shows a region 103t of reference light for arranging reference light so as not to overlap with the region 102a of object light, rather than a specific arrangement of point light sources. The region 103t of reference light is located outside the region 102a of object light in the incident pupil diameter 104a of an objective lens. In the region 103t of reference light, an appropriate number of point light sources can be arranged, and preferably, as in the case of the point light sources 103a to 103i in FIG. 5(A), point light sources are arranged so that reference light is not located in a point-symmetric position with respect to the other reference light with the optical axis of the objective lens as a center. As in the case of FIG. 5(B), when the region 103t of reference light is not overlapped with the region 102a of object light, one spatial light modulator can generate object light and reference light. It is to be noted that in order to intersect the polarization direction of object light with the polarization direction of reference light at right angle, a half wavelength plate is placed in either the region 103t of reference light or the region 102a of object light.

Figure 6:
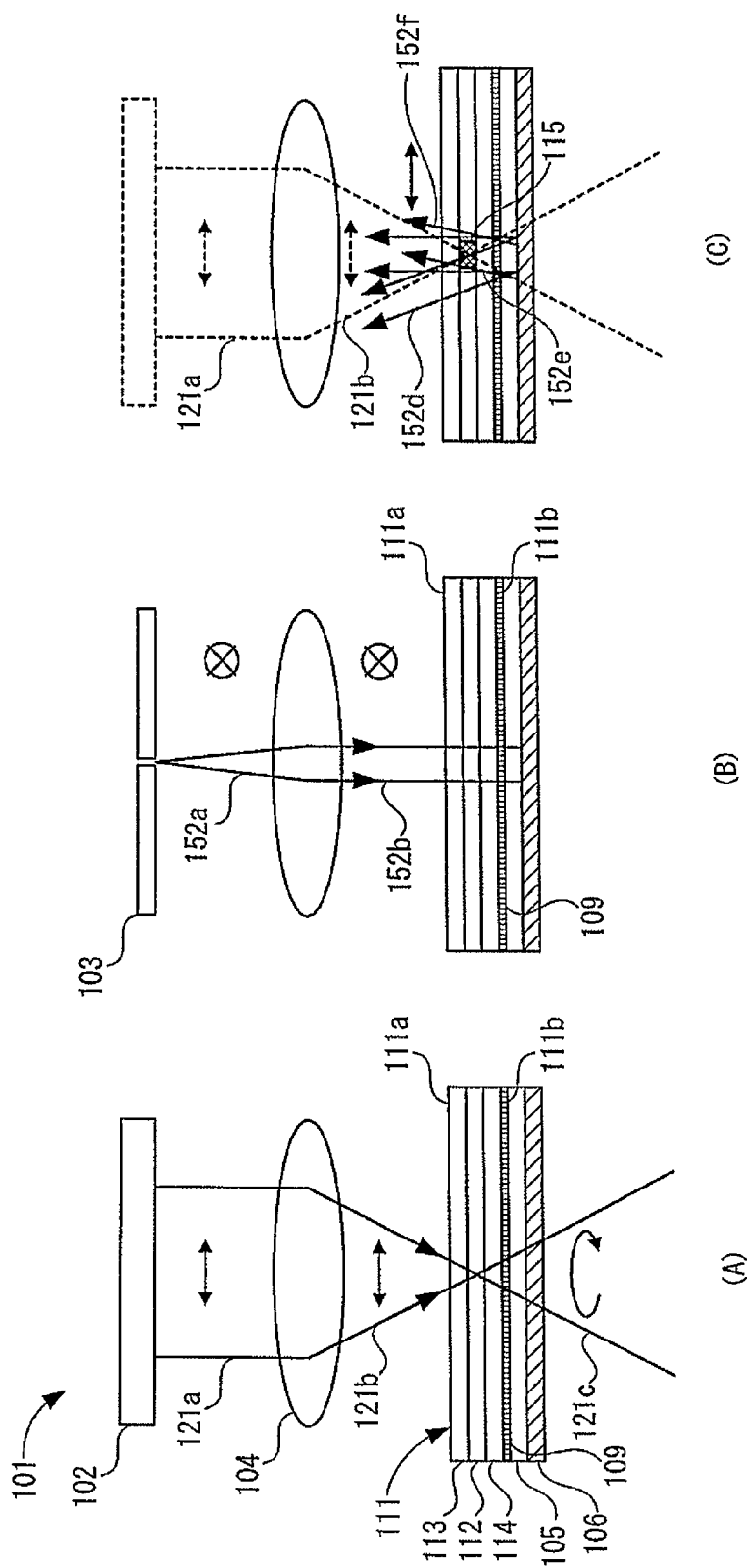
[FIG. 6] an explanatory diagram for another embodiment in which multiple rays of substantially parallel light in different travelling directions are transmitted as reference light.

FIG. 6 is an explanatory diagram for another embodiment in which multiple rays of substantially parallel light in different travelling directions are transmitted as reference light in a hologram recording layer 112. FIG. 6(A) is a schematic diagram illustrating an optical path of object light, FIG. 6(B) is a schematic diagram illustrating an optical path of reference light during irradiation, and FIG. 6(C) is a schematic diagram for explaining an optical path of reflected reference light and interference between reference light and object light. The same reference numerals are assigned to the same configuration as that of FIG. 1, and the description of the configuration will be omitted.

In FIG. 6, in addition to a first reference light generation means 103, a second reference light generation means 109 is provided between a recording medium 111 and a polarization light selecting reflection means 106 on a rear surface side 111b of a hologram recording layer 112. The first reference light generation means 103 generates a ray of reference light 152a of S-polarized light in the same way as in FIG. 1. The second reference light generation means 109 generates multiple rays of reference light 152d to 152f when reference light 152b of substantially parallel light formed by an irradiation means 104 transmits through the recording medium for irradiation. As the second reference light generation means 109, a diffraction grating can be used, and on the incidence of the reference light 152b, the reference light 152b is diffracted by the diffraction grating to generate multiple diffracted rays of substantially parallel light. Furthermore, the diffracted rays are reflected by the polarization light selecting reflection means 106, and each diffracted again when the diffracted rays transmit through the diffraction grating, to generate multiple diffracted rays of substantially parallel light, which can be used as multiple rays of reference light. The multiple rays of reference light 152d to 152f are P-polarized light formed by the polarization conversion means 105 to have a polarization direction intersecting at right angle, the P-polarized light incident from a rear surface 111b side of the recording medium 111 interferes with object light 121b of P-polarized light (indicated by a dotted line in FIG. 6(C)) from the surface 111a side of the recording medium 111 irradiated by the irradiation means 104 to form a reflection type hologram 115, and the reflection type hologram 115 is recorded. Furthermore, the multiple rays of reference light 152d to 152f of P-polarized light overlap with each other in the hologram recording layer, and a transmission type hologram (not shown) is formed and recorded in the overlapped regions.

Figure 7:
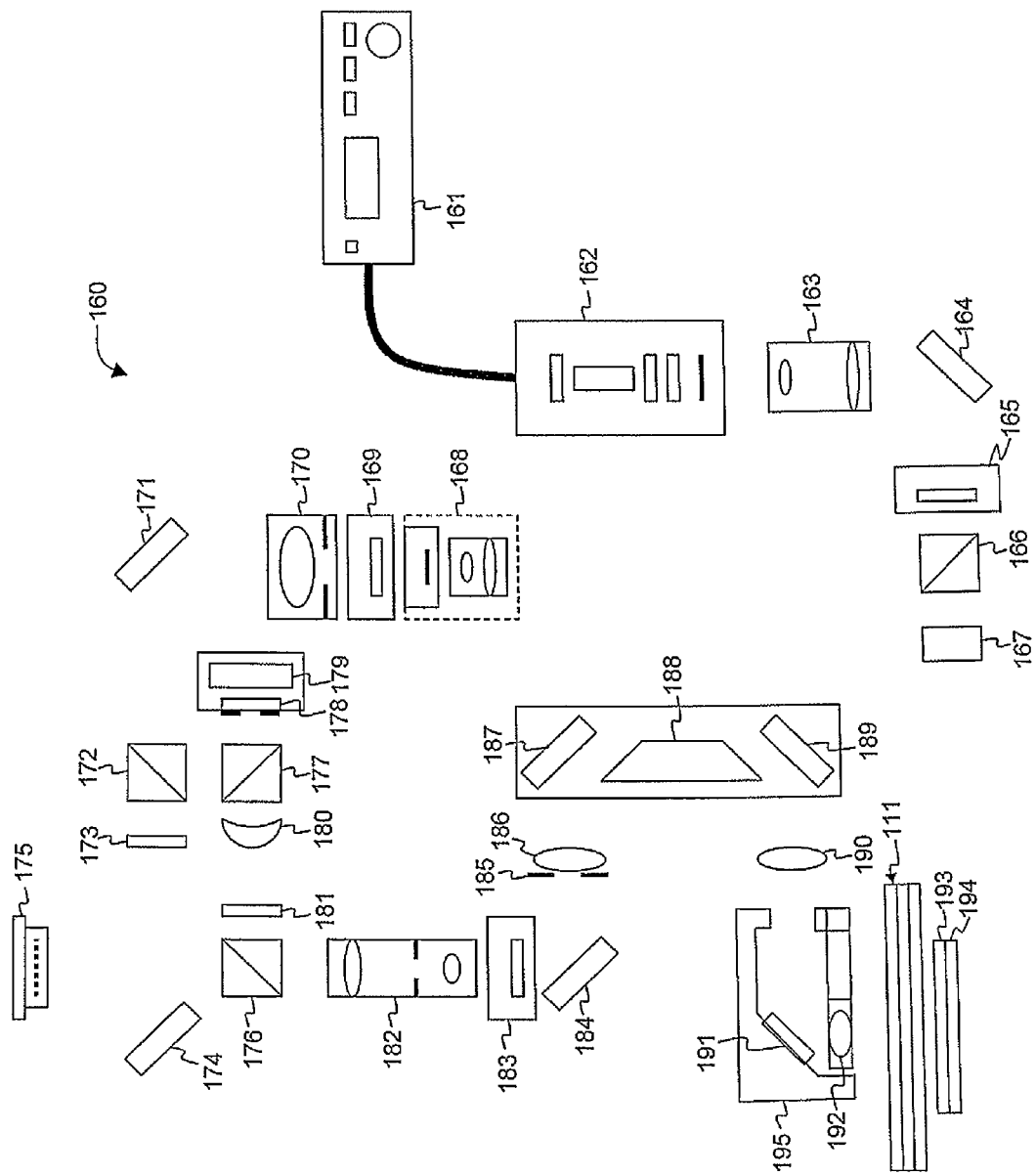
[FIG. 7] a schematic diagram illustrating the general structure of a hologram generating device according to the present invention.
Figure 8:
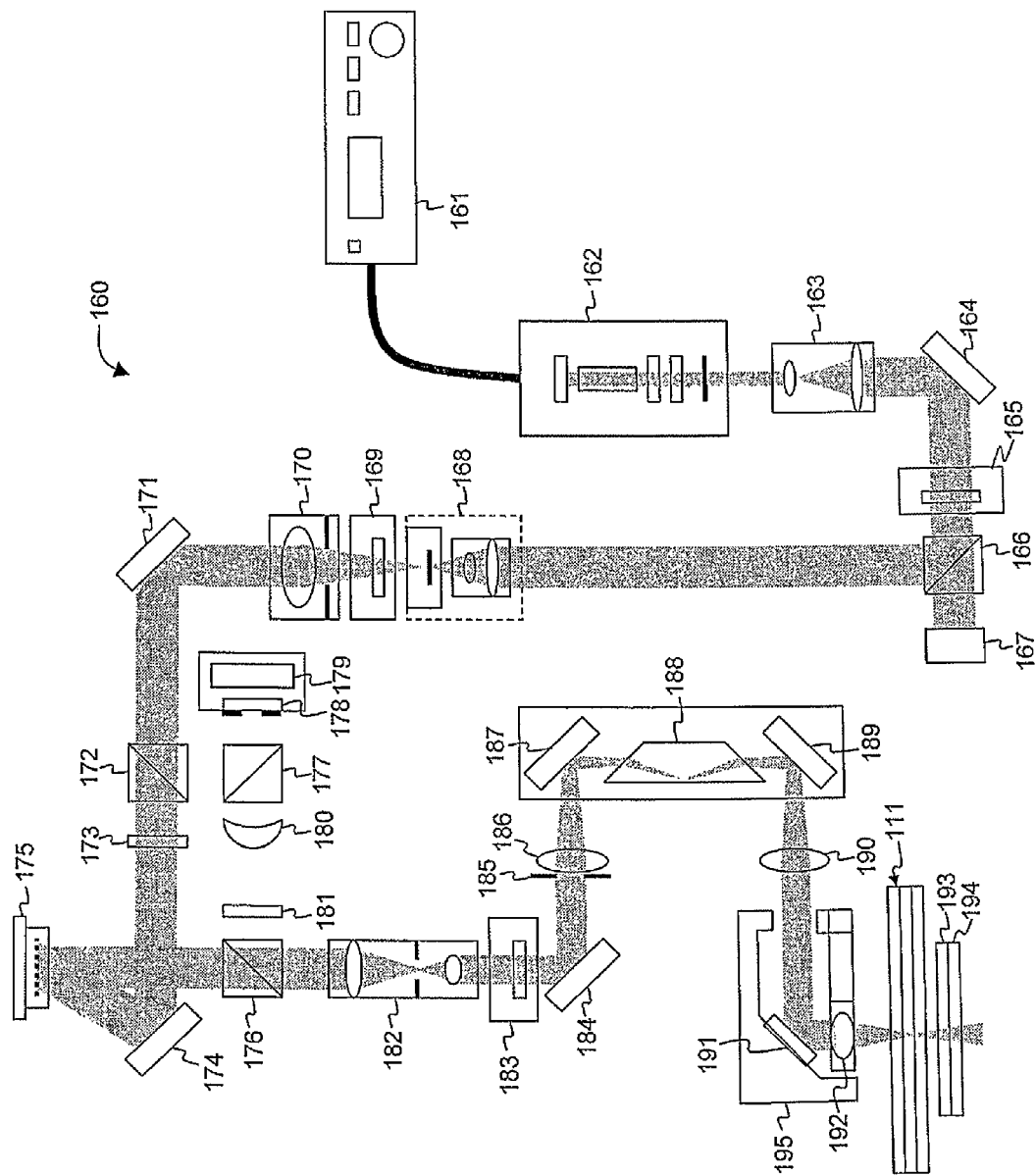
[FIG. 8] a diagram for explaining an optical path of object light in the hologram generating device according to the present invention.
Figure 9:
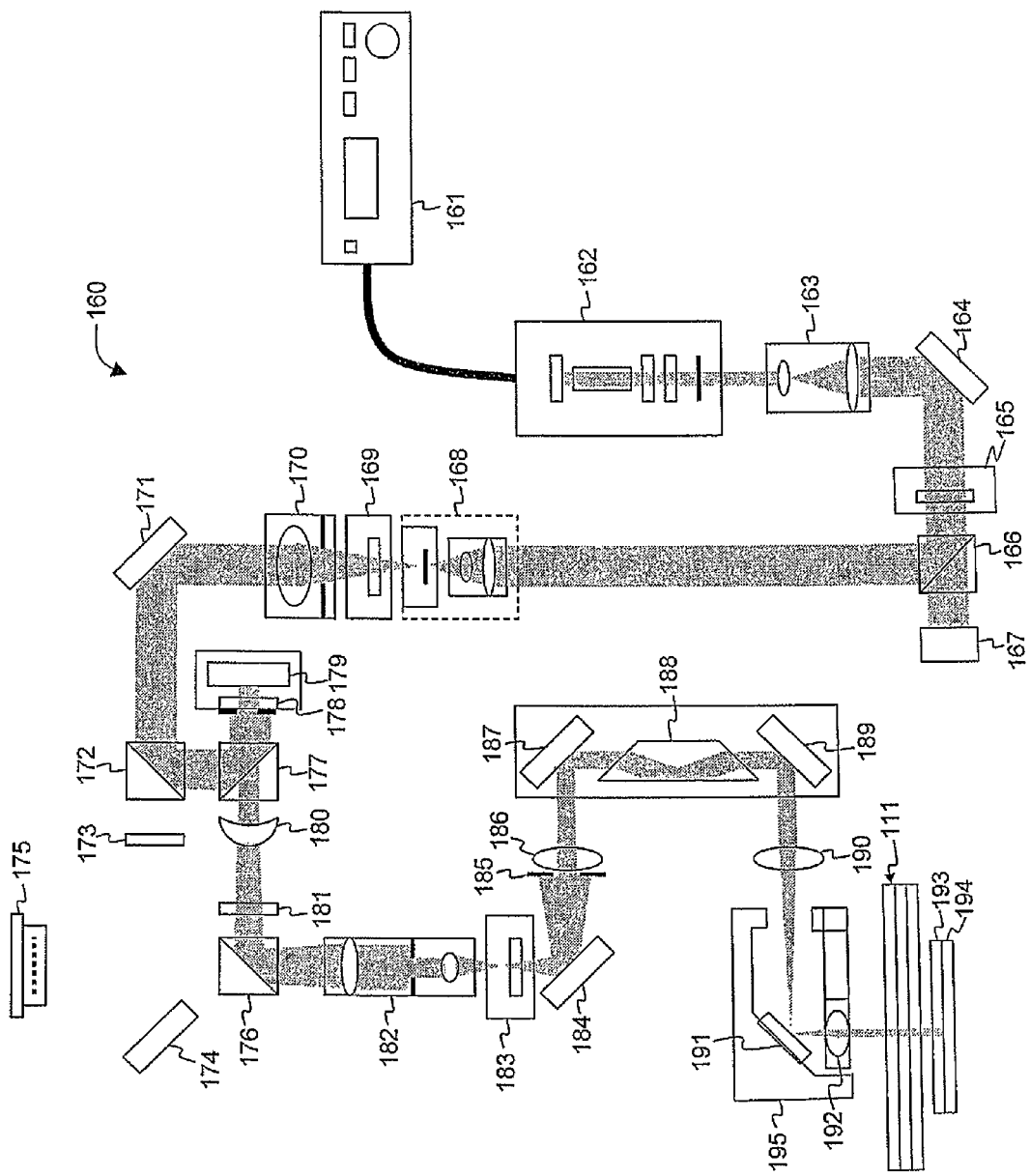
[FIG. 9] a diagram for explaining an optical path of reference light in the hologram generating device according to the present invention.

A more specific hologram generating device will be described below with reference to FIGS. 7 to 9. FIG. 7 is a schematic diagram illustrating the general structure of a hologram generating device 160, FIG. 8 is a diagram for explaining an optical path of object light, and FIG. 9 is a diagram for explaining an optical path of reference light. The hologram generating device 160 in FIGS. 7 to 9 includes a Q-switch laser light source 161, a light source head 162, a beam expander 163, a first mirror 164, a first half wavelength plate 165 (hereinafter, abbreviated as a "HWP" for a half wavelength plate), a first polarized beam splitter 166 (hereinafter abbreviated as a "PBS" for a polarized beam splitter), a light-blocking plate 167, a spatial filter 168, a second HWP 169, a lens 170, a second mirror 171, a second PBS 172, a first quarter wavelength plate (hereinafter, abbreviated as a "QWP" for a quarter wavelength plate) 173, a third mirror 174, a DMD 175, a third PBS 176, a fourth PBS 177, a second QWP 178, a fourth mirror 179, a concave lens 180, a third HWP 181, a zoom lens 182, a third QWP 183, a fifth mirror 184, an aperture 185, a first relay lens 186, a sixth mirror 187, a dove prism 188, a seventh mirror 189, a second relay lens 190, a eighth mirror 191, an objective lens 192, a fourth QWP 193, and wire grid polarizer 194, and further includes an actuator 195 for focusing and tracking and a recording medium moving means, not shown. It is to be noted that the hologram generating device 160 in FIGS. 7 to 9 is configured to allow some additional functions to be achieved, and composed of not only an essential configuration for the present invention.

With reference to FIG. 8, an optical path of object light will be described in the hologram generating device 160. A recording medium 111 is irradiated with object light through an optical path as shown in FIG. 8. First, pulse laser light (P-polarized light) of about 30 ns generated by the Q-switch laser light source 161 is radiated from the light source head 162. The laser light is expanded in beam diameter by the beam expander 163, and reflected by the first mirror 164. The first HWP 165 is intended to change the polarization direction of the laser light, which serves as a means for controlling the intensity of the laser light in combination with the first PBS 166. More specifically, the first HWP 165 is rotated to change the ratio between the P-polarized light component and the S-polarized light component in the laser light, and in the first PBS 166 which reflects only S-polarized light, only the S-polarized light component is separated to decrease the light intensity. It is to be noted that the P-polarized light component transmitting through the first PBS 166 is blocked by the light-blocking plate 167.

The S-polarized light reflected by the first PBS 166 has intensity unevenness eliminated by a high-power lens and a pinhole of the spatial filter 168, and is converted by the lens 170 to parallel light. The second HWP 169 rotates the polarization direction of light to provide a P-polarized light component and an S-polarized light component. The second HWP 169 is rotated to change the ratio between the P-polarized light component and the S-polarized light component, and is combined with the second PBS 172, thereby allowing the intensity ratio between object light and reference light to be adjusted. Then, parallel light (P+S) is reflected by the second mirror 171, and separated by the second PBS 172 into S-polarized light and P-polarized light. The P-polarized light passing through the second PBS 172 has an opposite phase added by the first QWP 173 in order to correct birefringence of the DMD 175. The third mirror 174 reflects the light toward the DMD 179 so that the incidence angle to the DMD 179 is twice as high as the inclined angle of a mirror of the DMD 179. Then, the light is spatially modulated by image information displayed on the DMD 179 to generate object light of P-polarized light.

The object light of P-polarized light emitted from the DMD 179 transmits through the third PBS 176, and the zoom lens 182 changes the magnification of the image information in accordance with the incident pupil diameter of the objective lens 192. After that, the polarization direction of the object light is converted by the third QWP 183 to right circularly polarized light. Then, the object light (right circularly) is reflected by the fifth mirror 184, and passed through the sixth mirror 187, the dove prism 188, and the seventh mirror 189 by the first relay lens 186 and the second relay lens 190 to form an image on the incident pupil plane of the objective lens 192. The sixth mirror 187 and the seventh mirror 189 are provided for reduction in the size of the device, and the dove prism 188 rotates the image information of the object light by 45° to provide an erected image.

Further, even when the recording medium 111 is rotated to record multiple holograms in a circumferential direction, the dove prism 188 can be rotated to match the orientations of images of respective holograms. More specifically, in the case of a rotational means for moving the recording medium 111, when multiple holograms are recorded directly in a circumferential direction, images of the respective holograms have rotationally symmetric orientations, and it is thus not possible to form images oriented in the same direction. However, when the dove prism 188 is rotated at half the rotation speed of the recording medium, an image of object light in the recording medium can be rotated so as to be consistently oriented in the same direction.

Then, the object light (right circularly) is reflected by the eighth mirror 191 toward the objective lens 192, and the objective lens 192 collects light for an image to be recorded, and irradiates the recording medium 111 with a Fourier transformed image. The object light transmitting through the recording medium 111 has right circularly polarized light converted by the fourth QWP 193 to P-polarized light. Since the wire grid polarizer 194 transmits P-polarized light, the object light directly transmits through the wire grid polarizer 194.

Next, an optical path of reference light in the hologram generating device 160 will be described with reference to FIG. 9. However, since the optical path up to the second PBS 172 is in common with the object light, description thereof will be omitted. S-polarized light reflected by the second PBS 172 is reflected by the fourth PBS 177, passes through the second QWP 178 to be converted to right circularly polarized light, is reflected by the fourth mirror 179, again passes through the second QWP 178 to be converted to P-polarized light, and transmits through the fourth PBS 177. This P-polarized light is converted by the third HWP 181 to the original S-polarized light. These fourth PBS 177, second QWP 178, fourth mirror 179, and third HWP 181 are provided to add the both-way optical path length from the fourth PBS 177 to the fourth mirror 179 to the optical path length of the reference light, and provided as an optical path length adjusting means for adjusting the optical path length of the reference light and the optical path length of the object light. In particular, the optical path length adjusting means is preferably provided to make the difference between the optical path length of the object light and the optical path length of the reference light (including the optical path length transmitting through the recording medium 111, reflected by the polarization light selecting reflection means, and again from the rear surface 111b of the recording medium 111 up to the hologram recording layer 112) shorter than the coherent length, because the coherent length is short in the case of using a Q-switch laser, as in the case of the hologram generating device 160 in FIGS. 7 to 9. In addition, since the optical path lengths of the object light and reference light may be changed depending on the condition or environment of the device, the optical path length adjusting means is preferably able to change, rather than fixes, the optical path length to be adjusted, so that this change can be absorbed. In the case of the optical path length adjusting means configured as described above, the optical path length to be adjusted is able to be changed if the fourth mirror 179 is configured so as to be able to move in the horizontal direction in FIG. 9. Furthermore, the second QWP 178 may be provided with an aperture for reducing the diameter of the reference light. While the reference light of substantially parallel light preferably has a comparable spot diameter with that of the object light as described previously, parallel light is preferably made thinner in a stepwise fashion in order to form such thin parallel light. In the hologram generating device 160 in FIG. 7, the aperture is made thinner in a stepwise fashion by an aperture of the second QWP 178, an aperture in the zoom lens 182, and the aperture 185 before the first relay lens 186.

The concave lens 180 is a section of the reference light generation means in the hologram generating device 160, which is intended to convert parallel light (P-polarized light) to diverging light. The concave lens 180 is preferably placed in such a way that the focal point of the diverging light is located in a position conjugate to the incident pupil plane of the objective lens. It is to be noted that the other section of the reference light generation means includes the second PBS 172 or the third HWP 181, as a means for intersecting the object light with the polarization direction. The diverging light (P-polarized light) is converted by the third QWP 183 to S-polarized light, and reflected by the third PBS 176 to overlap with the optical path of the object light. Subsequently, the diverging light (S-polarized light) is converted by the first lens in the zoom lens 182 to parallel light, and the parallel light is reduced in diameter by the aperture, and converted by the next lens to converging or diverging light. After that, the reference light is converted by the third QWP 183 to left circularly polarized light in terms of polarization direction. Then, the reference light (left circularly) is reflected by the fifth mirror 184, and the parallel light is further reduced in diameter by the aperture 185, and passed through the sixth mirror 187, the dove prism 188, and the seventh mirror 189 by the first relay lens 186 and the second relay lens 190 to form an image of a point light source on the incident pupil plane of the objective lens 192.

Then, the reference light (left circularly) is reflected by the eighth mirror 191 toward the objective lens 192, and the objective lens 192 irradiates the recording medium 111 with the reference light as parallel light. The left circularly polarized light of the reference light transmitting through the recording medium 111 is converted by the fourth QWP 193 to S-polarized light. The reference light of S-polarized light reflected by the wire grid polarizer 194 which reflects S-polarized light passes through the fourth QWP 193 again to be converted to right circularly polarized light, which is made incident to the hologram recording layer 112 from the rear surface 111b of the recording medium 111. Then, the reference light interferes with the object light of right circularly polarized light incident from the surface 111a to allow a reflection type hologram to be recorded.

In addition, the hologram generating device 160 may carry out focus servo for moving the positions irradiated with object light and reference light in the direction of the optical axis and tracking servo for moving the positions irradiated with object light and reference light in a direction parallel to the surface of the recording medium 111, with the use of the actuator 195 for tracking or/and a recording medium moving means, not shown. In order to carry out these types of servo, it is preferable to provide a light source for servo, separately from the light source for generating holograms, and form servo information for alignment, which is able to be read by the light source for servo, in the recording medium or on the rear surface side of the recording medium. In the case of providing a guide section including a polarization light selecting reflection means and a polarization conversion means on the rear surface side of the recording medium, servo information is preferably formed in the guide section. It is to be noted that the servo information may be pits or patterns arranged at regular intervals. Furthermore, while the basic clock used for determining the timing of recording in the hologram generating device may be externally input as a signal, the light source for servo may be allowed, for acquiring the basic clock, to read out clock information formed in the recording medium or on the rear surface side of the recording medium. Furthermore, without providing the light source for servo, the clock information can be also read out with the use of light transmitting through the polarization light selecting reflection means. For example, clock information and a light detecting means are provided on the transmission side (on the lower side in FIGS. 7 to 9) of the polarization light selecting reflection means, in such a way that the basic clock can be reproduced by modulating light transmitting through the polarization light selecting reflection means (information light in FIGS. 7 to 9) through the clock information (such as light-blocking sections at a constant period) and detecting the light intensity of the modulated transmitted light through the detection means.

The object light and the reference light can be superimposed on each other on the incident pupil plane of the objective lens by separating the optical path for generating the object light and the optical path for generating the reference light from each other as shown in FIGS. 7 to 9. It is to be noted that if the object light and the reference light are not superimposed on each other, a HWP for intersecting polarization directions at right angle provided in only either region in the DMD as a spatial light modulator allows the object light and the reference light to be generated. In the case of generating the object light and the reference light in the DMD, the need is at least eliminated for the second HWP 169, the second PBS 172, the third PBS 176, the fourth PBS 177, the second QWP 178, the fourth mirror 179, the concave lens 180, and the third HWP 181 in FIGS. 7 to 9.

Figure 10:
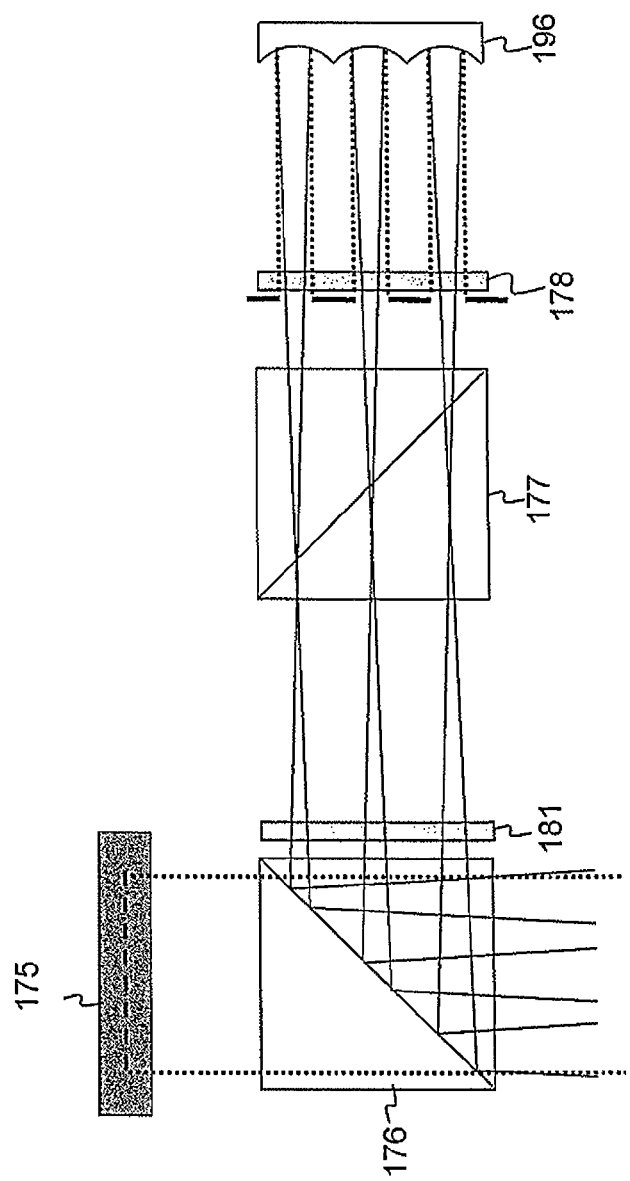
[FIG. 10] a diagram illustrating an embodiment of a means for generating multiple rays of reference light.

Further, in the case of irradiation with the reference light at a predetermined incidence angle, the position of the third PBS 176 may be moved parallel in a plane perpendicular to the optical axis of the object light. In addition, in the case of transmitting multiple rays of substantially parallel light in different travelling directions as the reference light in the hologram recording layer 112, for example, as shown in FIG. 10, multiple rays of reference light may be generated by a concave mirror array 196 including multiple minute concave mirrors. The concave mirror array 196 reflects incident parallel light as multiple rays of converging light. In this case, the focal point of the diverging light through the concave mirror array is preferably located in a position conjugate to the incident pupil plane of the objective lens. In the optical system of FIG. 7, a concave mirror array may be placed in place of the fourth mirror 179 to remove the concave lens 180. In addition, the aperture placed before the second QWP 178 shapes, in terms of diameter, multiple rays of reference light formed by the concave mirror array 196.

The hologram generating device according to the present invention is preferably used as a hologram printer for recording, on a recording medium, a hologram from which a three-dimensional image is reproduced through irradiation with reference light for reproduction. While the hologram is recorded by interference between object light and reference light, it is difficult to record the hologram through one-time irradiation because of restrictions on the diameter of light and the sizes of optical members such as an objective lens. Therefore, it is preferable to record a partial hologram corresponding to a recording position in a recording medium (a hologram constituting a section of the entire hologram) by interference between object light and reference light, and repeat this recording of a partial hologram in planar direction, thereby recording a hologram from which one three-dimensional image is reproduced as a whole. It is to be noted that the information carried by object light is not to be considered limited to three-dimensional image information, and the hologram generating device according to the present invention is also able to record information other than three-dimensional images.

The image information carried by object light for recording each partial hologram can be obtained by calculating a three-dimensional partial image from a three-dimensional image to be reproduced and calculating the image information for forming each partial hologram from the three-dimensional partial image, or calculating the entire hologram formed in the recording medium and calculating the image information for forming each partial hologram from the entire hologram.

Figure 11:
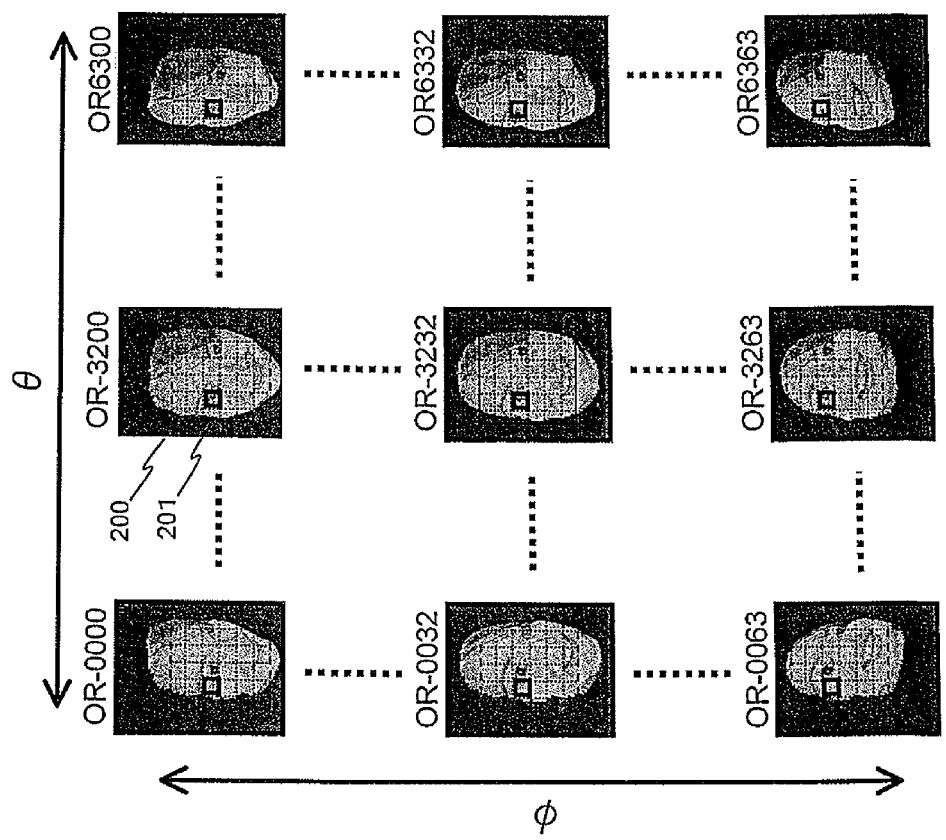
[FIG. 11] a diagram illustrating parallax images from different points of view.

In order to calculate a three-dimensional partial image from a three-dimensional image to be reproduced and calculate the image information for forming each partial hologram from the three-dimensional partial image, parallax images 200 from different points of view are prepared as shown in FIG. 11, from photographed images conveying three-dimensional information shot by a three-dimensional shape measuring system, images captured from images with varying points of view from three-dimensional images (CG images) formed by computer graphics, three-dimensional tomography images captured by a CT scanner for use in a medical field, etc. The parallax images 200 are subjected to slice & dice processing to generate image information on each ray of object light, on the basis of parameters such as an objective lens used, a pitch at which a partial hologram is recorded, and a pixel pitch of a spatial light modulator.

More specifically, in order to record a partial hologram in which the convergent angle obtained by an objective lens used corresponds to the angle of the parallax image 200 at 1:1, multiple parallax images in a θ direction and in a φ direction are prepared with the angle determined by the numerical aperture NA of the objective lens as the upper limit. For example, the number of parallax images in the θ direction (for example, m) and the number of parallax images in the φ direction (for example, n) are prepared. In FIG. 11, the number of parallax images is 64 both in the θ direction and in the φ direction, so that 4096 parallax images are prepared in total. In FIG. 11, symbols and numbers assigned above the images indicate the coordinates m, n of the images. Next, each parallax image 200 is divided into m×n minute images 201 (in the case of FIG. 11, the parallax images are divided into 64 minute images both in the θ direction and in the φ direction. However, FIG. 11 shows the division into 6×6 for convenience of scale reduction). This processing is referred to as slice & dice processing. The minute images 201 in the same position (the square enclosed by a heavy line in FIG. 11) in the respective parallax images 200 subjected to this slice & dice processing are extracted, and placed in the same arrangement as that of the parallax images to synthesize one new image. This synthesized image serves as image information carried by object light for forming a partial hologram. More specifically, this image information is such deployment of images in a two-dimensional plane, which are obtained by observing a section of a three-dimensional image from different parallax directions. The synthesis processing is executed for all of the minute images to obtain rearranged image information for the respective m×n minute images 201. In the case of FIG. 11, image information of 64×64=4096 images for recording is newly generated from the parallax images 200 in a matrix of 64×64=4096 images. Depending on the size of the entire hologram, the pitch for recording is selected. In addition, while the increased number of parallax images m×n allows a higher-resolution three-dimensional image to be printed, optimum parameters are set depending on the restriction on the number of pixels of the spatial light modulator, etc. This method is simpler in terms of calculation than a method described below of calculating the entire hologram formed in a recording medium and calculating the image information for forming each partial hologram from the entire hologram, and appropriately sets the parameters to form a hologram which also provides a three-dimensional image to be reproduced with comparable quality, thus allowing the time for generating a hologram to be reduced, and allowing the speed as a hologram printer to be increased.

As another method for generating information on each image, there is a method of calculating the entire hologram formed in a recording medium and calculating image information for forming each partial hologram from the entire hologram. In this method, first, a computational technique of holography is used to assume reference light and object light from a three-dimensional image to be displayed, and the entire hologram is calculated which is formed in the recording medium when the recording medium is irradiated with the reference light and the object light. Next, the entire hologram obtained by the calculation is divided into partial holograms, and reference light and object light are calculated for each partial hologram. Furthermore, such a modulation pattern that provides reference light and object light is calculated for each partial hologram to generate image information on the object light.

Figure 12:
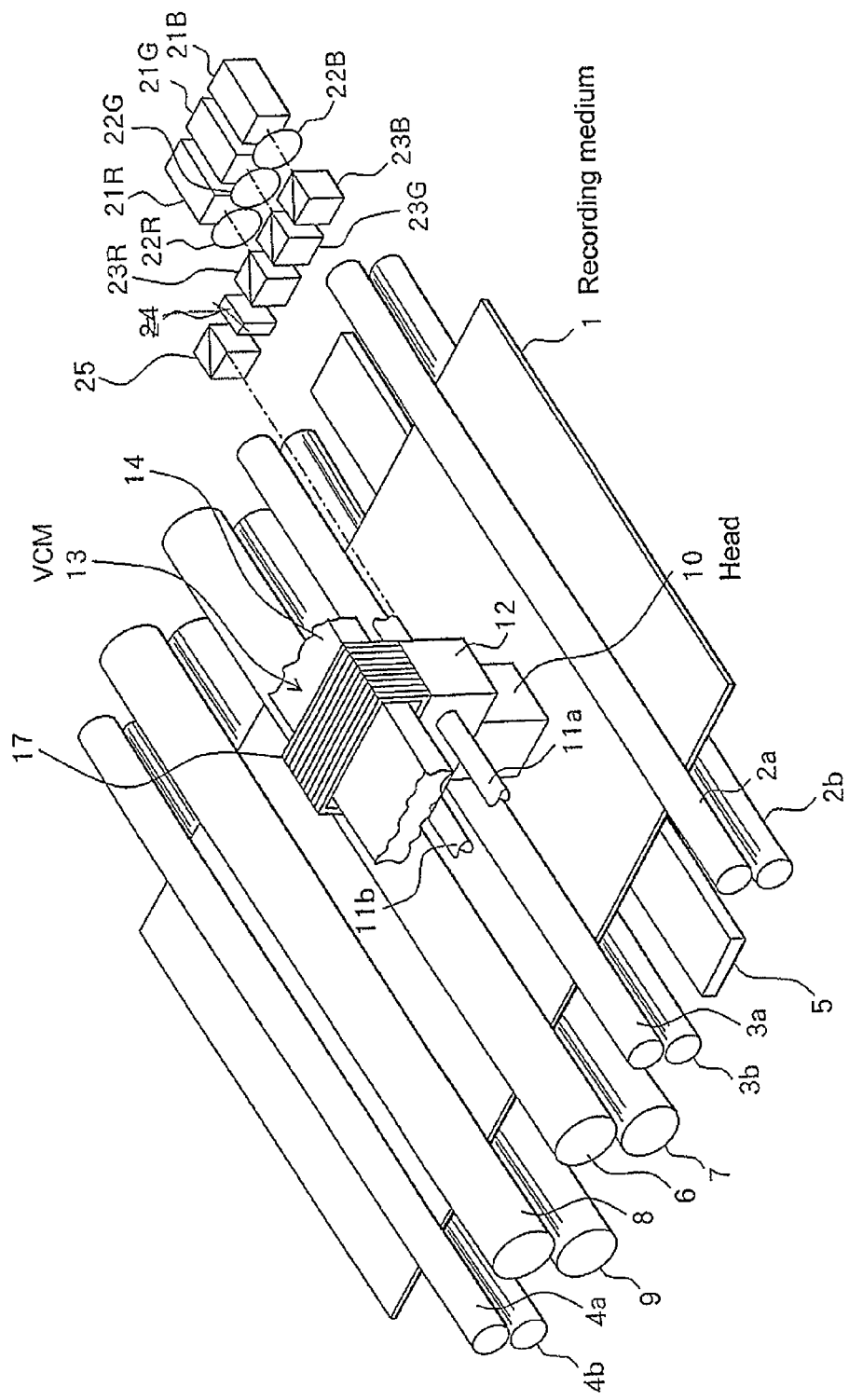
[FIG. 12] a schematic configuration diagram of a hologram printer.
Figure 13:
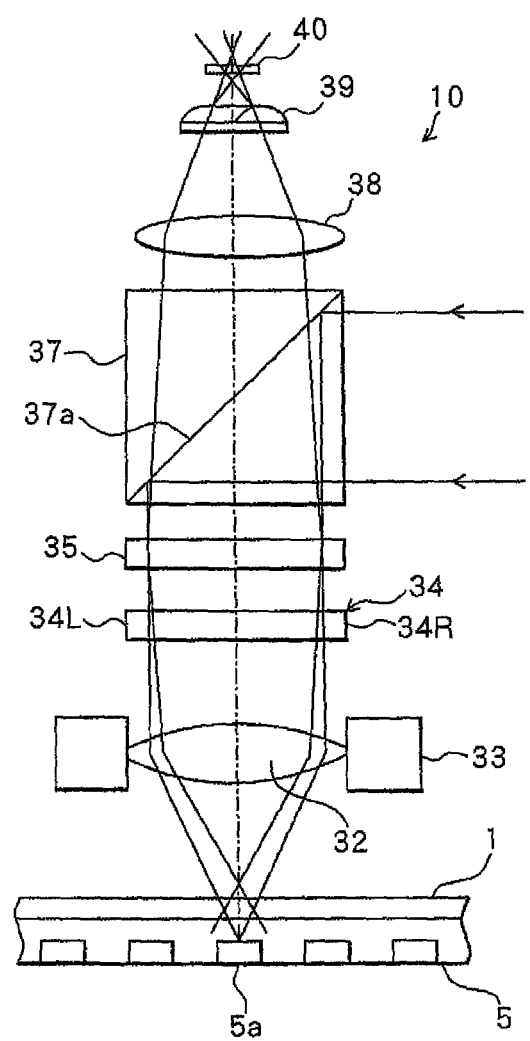
[FIG. 13] a diagram illustrating a section of an optical system of a conventional hologram generating device.

FIG. 12 is a schematic configuration diagram of a hologram printer. In FIG. 12, the hologram printer includes a sheet-shaped recording medium 1, three pairs of cylindrical conveying rollers 2a, 2b; 3a, 3b; 4a, 4b as a moving means for conveying from a feeding section, not shown, to a ejecting section, not shown, a plate-like guide section 5 placed parallel to the axis direction of the conveying roller in a position on the rear surface side of the recording medium 1 between the conveying rollers 2a, 2b and the conveying rollers 3a, 3b, and a head 10 placed so as to be opposed to the guide section 5 with the recording medium 1 interposed therebetween in a position on the surface side of the recording medium 1. Furthermore, the hologram printer includes a red light source device 21R for emitting red coherent laser light, a green light source device 21G for emitting green coherent laser light, a blue light source device 21B for emitting blue coherent laser light, collimator lenses 22R, 22G, 22B for converting laser light emitted from the respective light source devices 21R, 21G, 21B respectively to parallel beams of light, a dichroic prism 23R for incident light passing through the collimator lens 22R, a dichroic prism 23G for incident light passing through the collimator lens 22G, and a reflecting prism 23B for incident light passing through the collimator lens 22B.

The reflecting prism 23B is intended to reflect blue light passing through the collimator lens 22B. The blue light reflected by the reflecting prism 23B is adapted to be made incident to the dichroic prism 23G from the side. The dichroic prism 23G is adapted to reflect green light passing through the collimator lens 22G and transmit the blue light from the reflecting prism 23B side. The green light reflected by the dichroic prism 23G and the blue light transmitting through the dichroic prism 23G are both made incident to the dichroic prism 23R from the side. The dichroic prism 23R is adapted to reflect red light passing through the collimator lens 22R and transmit the blue light and green light from the dichroic prism 23G side. The red light reflected by the dichroic prism 23R and the blue light and green light transmitting through the dichroic prism 23R are both emitted from the dichroic prism 23R in the same direction. Furthermore, each light of red, green, and blue from the dichroic prism 23R is reflected by the reflecting prism 25 to be made incident to the head 10.

The head 10 has an irradiation means including an object light generation means, a reference light generation means, and an objective lens, which generates object light with a first polarization direction and reference light with a second polarization direction intersecting with the first polarization direction at right angle, from each light of red, green, blue incident from the reflecting prism 25, and irradiates the recording medium 1 with the object light and the reference light. As the head 10, for example, the optical system from the second PBS 172 to the objective lens 192 in FIG. 7 may be provided.

The guide section 5 refers to a member for supporting the sheet-shaped recording medium 1 on the rear surface of the recording medium 1, and may include a polarization light selecting reflection means and a polarization conversion means provided on the recording medium 1 side of the guide section 5. In this case, the polarization light selecting reflection means and the polarization conversion means are provided linearly in the guide section 5 in the axis direction of the conveying roller. It is to be noted that the guide section 5 may be formed with the use of a material which transmits object light and reference light, whereas a polarization light selecting reflection means and a polarization conversion means may be provided separately on the opposite side of the guide section 5 from the recording medium 1. Either one of object light and reference light which are radiated from the head 10 and transmit the recording medium 1 is reflected by the polarization light selecting reflection means, converted by the polarization conversion means to light in a direction intersecting with the polarization direction, and made incident to the recording medium 1 from the rear surface of the recording medium 1. Then, in the recording medium 1, the incident light interferes with the other of the object light and reference light incident from the surface side to form a reflection type partial hologram, and the partial hologram is recorded.

Furthermore, the hologram printer includes a cylindrical ultraviolet lamp 6 placed in a position on the surface side of the recording medium 1 between the conveying rollers 3a, 3b and the conveying rollers 4a, 4b, a cylindrical pinch roller 7 placed below the ultraviolet lamp 6 for holding the recording medium 1 along with the ultraviolet lamp 6, a cylindrical heat roller 8 placed in a position on the surface side of the recording medium 1 between these ultraviolet lamp 6 and pinch roller 7 and the conveying rollers 4a, 4b, and a cylindrical pinch roller 9 for holding the recording medium 1 along with the heat roller 8. The ultraviolet lamp 6 is intended to irradiate the recording medium 1 with ultraviolet, whereas the heat roller 8 is intended to apply heat to the recording medium 1, and these ultraviolet lamp 6 and heat roller 8 correspond to the fixing means in the present invention.

In addition, the hologram printer includes two guide shafts 11a, 11b arranged parallel to the axis direction of the conveying roller above the head 10, and a movable section 12 guided by the guide shafts 11a, 11b to be movable along the guide shafts 11a, 11b. The head 10 is joined with the lower end surface of the movable section 12 so as to move along with the movable section 12. The movable section 12 is adapted to be moved along the guide shafts 11a, 11b by a voice coil motor (hereinafter, referred to as a VCM) 13. This VCM 13 includes a VCM yoke 14 placed parallel to the guide shafts 11a, 11b above the guide shafts 11a, 11b, a VCM yoke placed apart at a predetermined interval and parallel to the VCM yoke 14 above the VCM yoke 14, and connected at its end to the VCM yoke 14, a plate-like VCM magnet fixed at the lower surface of the VCM yoke, and a voice coil 17 placed apart at a predetermined interval from the peripheral surface of the VCM yoke 14 in the periphery of the VCM yoke 14. The voice coil 17 is joined to the upper end surface of the movable section 12. It is to be noted that the VCM yoke and the VCM magnet are omitted in FIG. 12. The thus configured VCM 13 allows the head 10 to be moved parallel to the guide shafts 11a, 11b. The conveying rollers 2a to 4b and the VCM each constitute the position changing means in the present invention for changing the relative positional relationship between the head 10 and the recording medium 1.

While the recording medium 1 is conveyed by the conveying rollers 2a to 4b, the conveying rollers 2a to 4b stop the recording medium 1 as long as the head 10 forms a partial hologram for one line. During the period of stopping the recording medium 1, the head 10 forms a partial hologram sequentially while moving from one end to the other end in a range in which the partial hologram is formed. Then, when the partial hologram for one line is formed, the conveying rollers 2a to 4b moves the recording medium 1 by a predetermined line-to-line distance, and then stops the recording medium 1. Then, in the same way as in the operation described above, a partial hologram for the next one line is formed. This operation is repeated to generate the entire hologram.

When the recording medium 1 is conveyed by the conveying rollers 2a to 4b, the section of the recording medium 1 in which the partial hologram is formed reaches the position of the ultraviolet lamp 6, in which the section is irradiated with ultraviolet by the ultraviolet lamp 6, and further reaches the position of the heat roller 8, in which heat is applied to the section by the heat roller 8 to fix the partial hologram recorded by the head 10. The recording medium 1 for which the formation and fixing of all of the partial holograms have been completed, which serves as a stabilized hologram, is conveyed by the conveying rollers 2a to 4b, and ejected from an ejecting section. It is to be noted that the ultraviolet lamp 6 and the heat roller 8 are appropriately provided depending on the type of the recording medium 1.

While the hologram is recorded by moving the recording medium 1 in one direction while moving the head 10 in a direction intersecting with the direction of moving the recording medium 1 at right angle in the hologram printer in FIG. 12, the present invention is not to be considered limited to this configuration. The recording medium 1 may be configured to be movable in two axis directions intersecting with each other at right angle parallel to the optical axis with the irradiating position of the head 10 fixed, or conversely, the head 10 may be configured to be movable in two axis directions intersecting with each other at right angle parallel to the optical axis. Alternatively, multiple heads 10 may be provided and arranged so that at least positions irradiated with object light and reference light radiated from the heads 10 are arranged in a line, thereby allowing a partial hologram for one line to be recorded at a time. In this case, the recording medium or the group of heads can be moved in a direction intersecting with the arrangement at right angle to record a hologram.

Description of the Reference Numerals
- 101 hologram generating device
- 102 object light generation means
- 103 reference light generation means
- 104 irradiation means
- 105 polarization conversion means
- 106 polarization light selecting reflection means
- 111 recording medium
- 112 hologram recording layer
- 115 hologram
- 121 object light
- 122 reference light

The invention claimed is:
1. A hologram printer comprising:
(a) a light source;

(b) an object light generation means for generating object light in a first polarization direction with the use of a portion of light from the light source;

(c) a reference light generation means for generating reference light in a second polarization direction intersecting with the first polarization direction at right angle with the use of other portion of light from the light source;

(d) an irradiation means for irradiating a front surface side of a hologram recording layer of the recording medium with the object light and the reference light;

(e) a polarization light selecting reflection means placed on a rear surface side of the hologram recording layer for reflecting the reference light transmitting through the hologram recording layer toward the hologram recording layer without reflecting the object light; and (f) a polarization conversion means placed between the hologram recording layer and the polarization light selecting reflection means for converting the reference light reflected by the polarization light selecting reflection means to light in a polarization direction intersecting with that in the case of transmitting through the hologram recording layer at right angle, before reaching the hologram recording layer, wherein a reflection type hologram is recorded on the hologram recording layer, the reflection type hologram formed by interference in the hologram recording layer between the reference light incident from the rear surface side of the hologram recording layer, having the polarization direction converted by the polarization conversion means, and the object light incident from the front surface side of the hologram recording layer, and wherein said recorded reflection type hologram is a portion of a hologram from which a three-dimensional image is reproduced through irradiation with reference light for reproduction, and the reflection type hologram is recorded repeatedly in a planar direction of the recording medium to record a hologram from which one three-dimensional image is reproduced as a whole.

2. The hologram printer according to claim 1, characterized in that the irradiation means irradiates the recording medium with the reference light as substantially parallel light.

3. The hologram printer according to claim 1, characterized in that the reference light generation means generates multiple rays of reference light, and the multiple rays of reference light pass through the hologram recording layer as multiple rays of substantially parallel light in different travelling directions.

4. The hologram printer according to claim 3, characterized in that a section of the reference light generation means is placed on a rear surface side of the hologram recording layer, and multiple rays of reference light are generated in the section of the reference light generation means.

5. The hologram printer according to claim 3, characterized in that the reference light generation means includes a spatial light modulator which also function as at least a section of the object light generation means, and point light sources to serve as multiple rays of reference light are displayed outside a region of the spatial light modulator in which image information of object light is displayed.

6. The hologram printer according to claim 1, characterized in that the irradiation means includes an objective lens, and irradiates the recording medium with a Fourier transformed image of the object light.

7. The hologram printer according to claim 1, characterized in that the polarization light selecting reflection means is a wire grid polarizer.

8. The hologram printer according to claim 1, characterized in that the polarization light selecting reflection means is a cholesteric liquid crystal film.

9. The hologram printer according to claim 1, characterized in that the object light carries image information calculated from a three-dimensional partial image calculated from a three-dimensional image to be reproduced.

\* \* \* \* \*